United States Patent [19]

Pechanek et al.

[11] Patent Number: 5,682,491
[45] Date of Patent: Oct. 28, 1997

[54] SELECTIVE PROCESSING AND ROUTING OF RESULTS AMONG PROCESSORS CONTROLLED BY DECODING INSTRUCTIONS USING MASK VALUE DERIVED FROM INSTRUCTION TAG AND PROCESSOR IDENTIFIER

[75] Inventors: Gerald G. Pechanek, Cary; Larry D. Larsen, Raleigh; Clair John Glossner, Durham, all of N.C.; Stamatis Vassiliaadis, Zoetermeer, Netherlands; Daniel H. McCabe, Chapel Hill, N.C.

[73] Assignee: International Business Machines Corporation, Armonk, N.Y.

[21] Appl. No.: 366,140

[22] Filed: Dec. 29, 1994

[51] Int. Cl.⁶ .................................................. G06F 15/16
[52] U.S. Cl. .............. 395/385; 395/200.03; 395/200.15; 395/200.16; 395/567; 395/851; 395/376
[58] Field of Search .................................. 395/375, 650, 395/851, 800, 200.03, 200.15, 200.16, 385, 567, 376

[56] References Cited

U.S. PATENT DOCUMENTS

| | | | |
|---|---|---|---|
| 4,783,738 | 11/1988 | Li et al. | 395/800 |
| 4,855,903 | 8/1989 | Carleton et al. | 395/200.05 |
| 4,891,787 | 1/1990 | Gifford | 395/375 |
| 4,994,961 | 2/1991 | MacGregor et al. | 395/650 |
| 5,020,059 | 5/1991 | Gorin et al. | 371/11.3 |
| 5,163,133 | 11/1992 | Morgan et al. | 395/800 |
| 5,226,170 | 7/1993 | Rubinfield | 395/800 |
| 5,535,413 | 7/1996 | Ishikawa et al. | 395/800 |

FOREIGN PATENT DOCUMENTS

| | | |
|---|---|---|
| 0257581 | 3/1988 | European Pat. Off. |
| 0449661 | 10/1991 | European Pat. Off. |
| 2262175 | 6/1993 | United Kingdom. |

OTHER PUBLICATIONS

Proceedings of the Supercomputing Conference, Orlando, Nov. 14–Nov. 18, 1988, Conf. 1, Nov. 1988, Institute of Electrical and Electronics Engineers, pp. 88–95, XP000119386.

Lingtao Wang et al: "I-Net Mechanism for Issuing Multiple Instructions".

Proceedings of the Midwest Symposium on Circuits and Systems, Monterey, May 14–17, 1991, vol. 2, 14 May 1991, pp. 839–842.

Si Mahmoud Karabernou: "VLSI Design of a Massively Parallel Processor".

*Primary Examiner*—Kenneth S. Kim
*Attorney, Agent, or Firm*—Steven B. Phillips; John E. Hoel

[57] ABSTRACT

An array processor topology reconfiguration system and method enables processor elements in an array to dynamically reconfigure their mutual interconnection for the exchange of arithmetic results between the processors. Each processor element includes an interconnection switch which is controlled by an instruction decoder in the processor. Instructions are broadcast to all of the processors in the array. The instructions are uniquely interpreted at each respective processor in the array, depending upon the processor identity. The interpretation of the commonly broadcast instruction is uniquely performed at each processor by combining the processor identity for the executing processor, with a value in the instruction. The resulting control signals from the instruction decoder to the interconnection switch, provides for a customized linkage between the executing processor and other processors in the array.

21 Claims, 30 Drawing Sheets

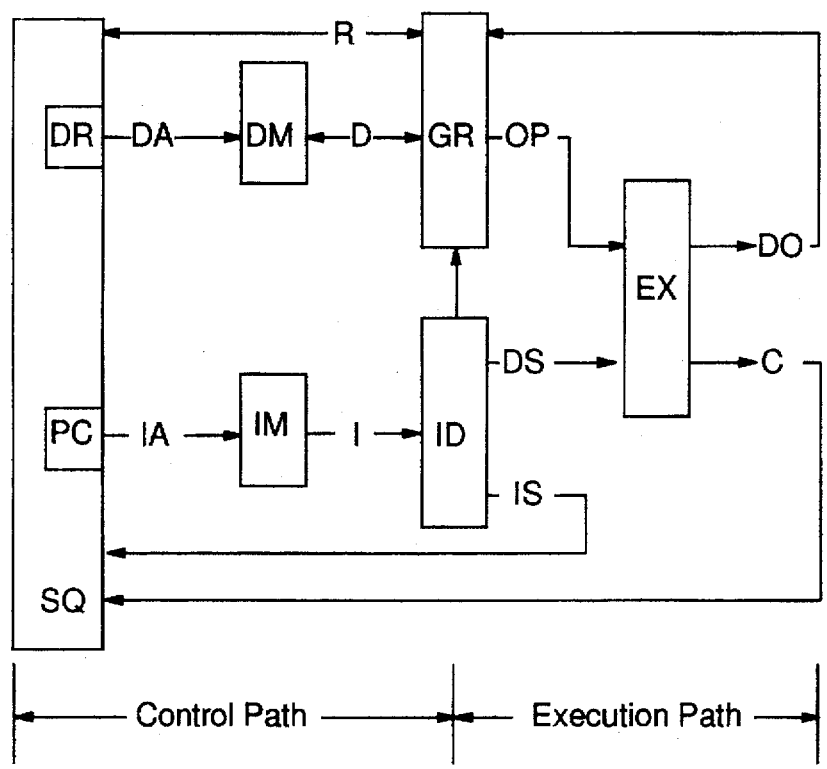

Blocks

| | | |
|---|---|---|
| SQ | = | Sequencer Including DR & PC;<br>DR = Data Address Generator<br>PC = Program Counter |
| DM | = | Data Memory |
| IM | = | Instruction Memory |
| GR | = | General Purpose Registers |
| ID | = | Instruction Decode Logic |
| EX | = | Execution Unit |

Signals

| | | |
|---|---|---|
| DA | = | Data Memory Address & Controls |
| D | = | Data |
| IA | = | Instruction Memory Address & Controls |
| I | = | Instructions |
| R | = | Sequencer Register Data |
| OP | = | Register Operand Data |
| L | = | Register Select Signals |
| IS | = | Instruction Signals (Branch, Addr. Gen, ...) |
| DS | = | Data Signals (ALU, MPY, DR Sel Cntl,...) |
| DO | = | Data Output Bus (from Execution Unit) |
| C | = | Condition Signal |

FIG 1

SR = Sequencer General Purpose Registers
DR = Data Path General Purpose Registers
SD = Sequencer Instruction Decode Logic
DD = Data Unit Instruction Decode Logic

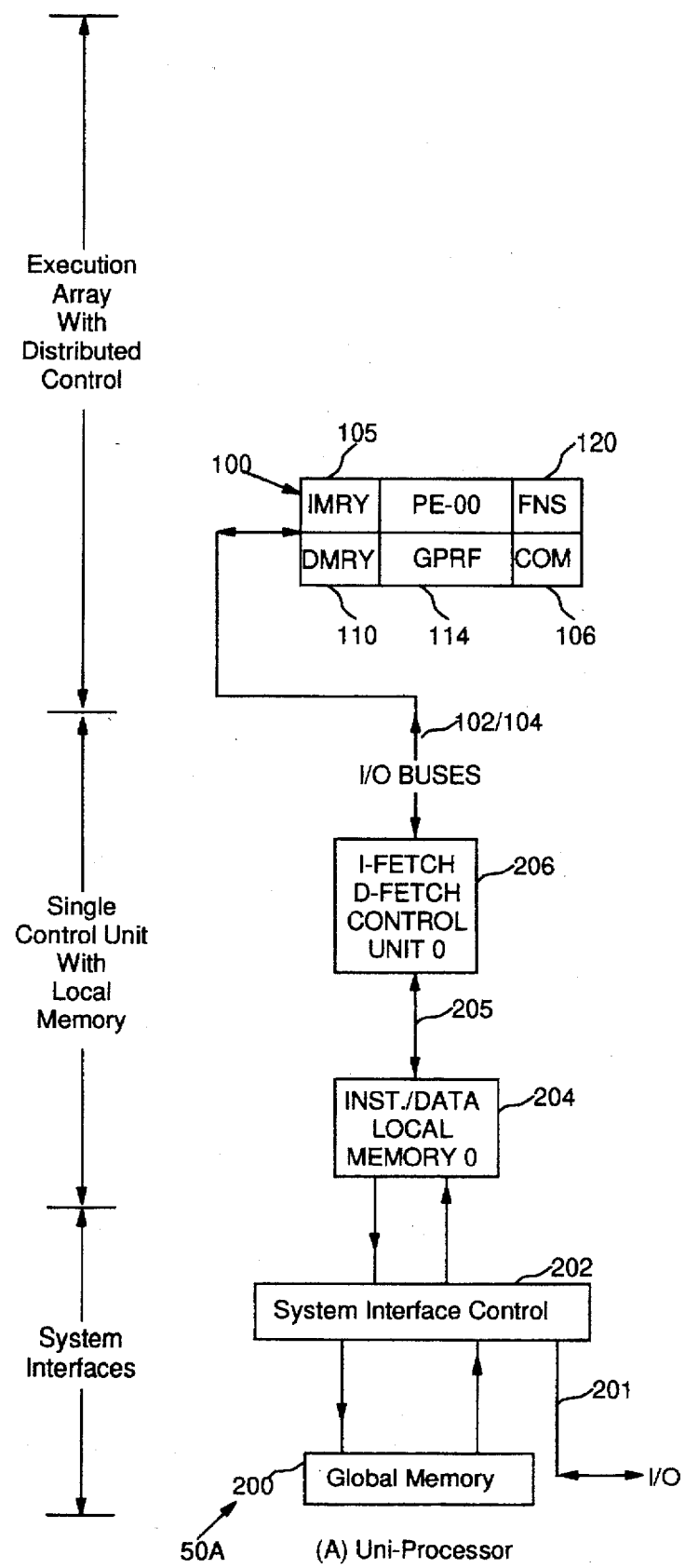
FIG 5-A

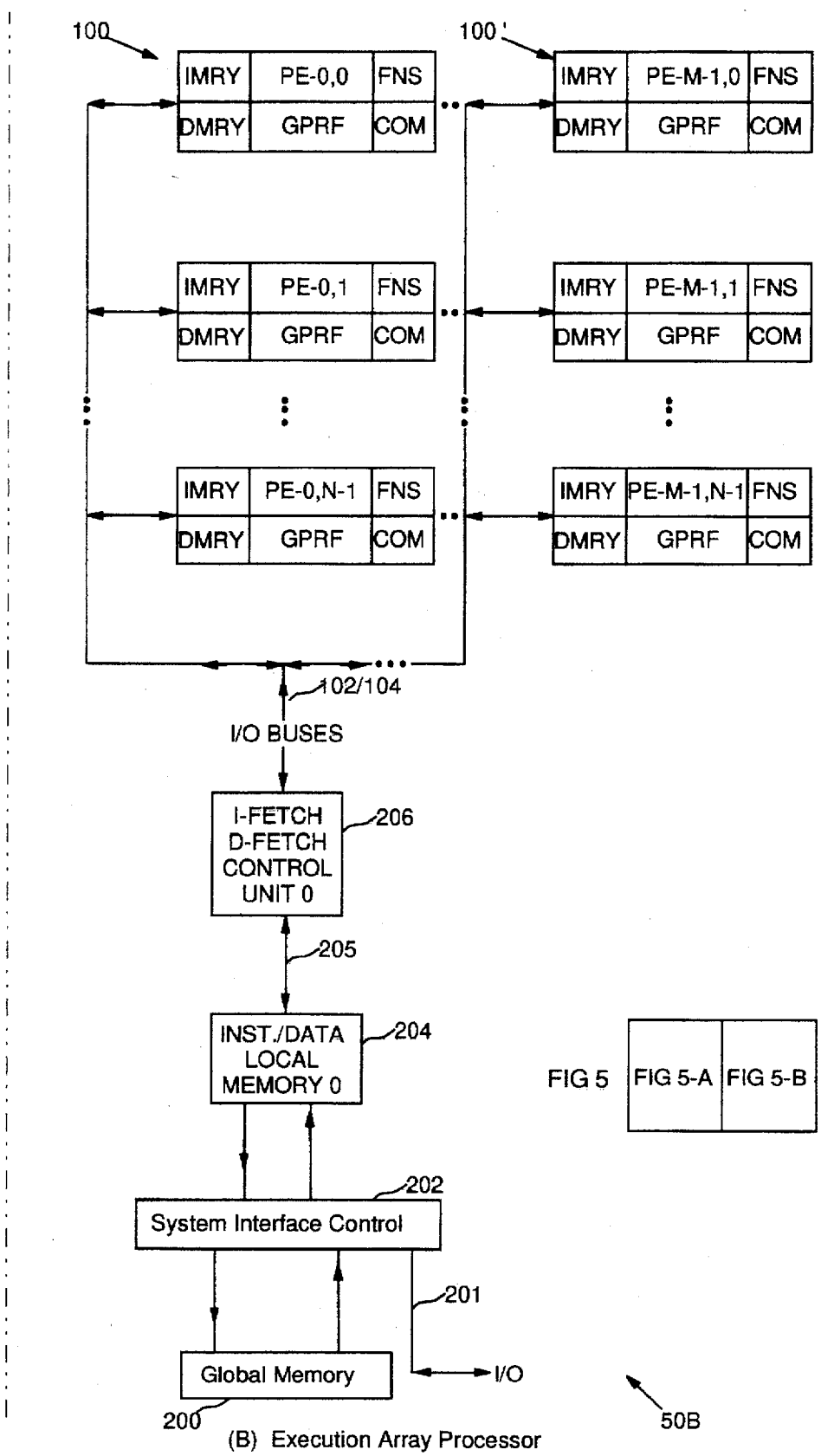
(B) Execution Array Processor
FIG 5-B

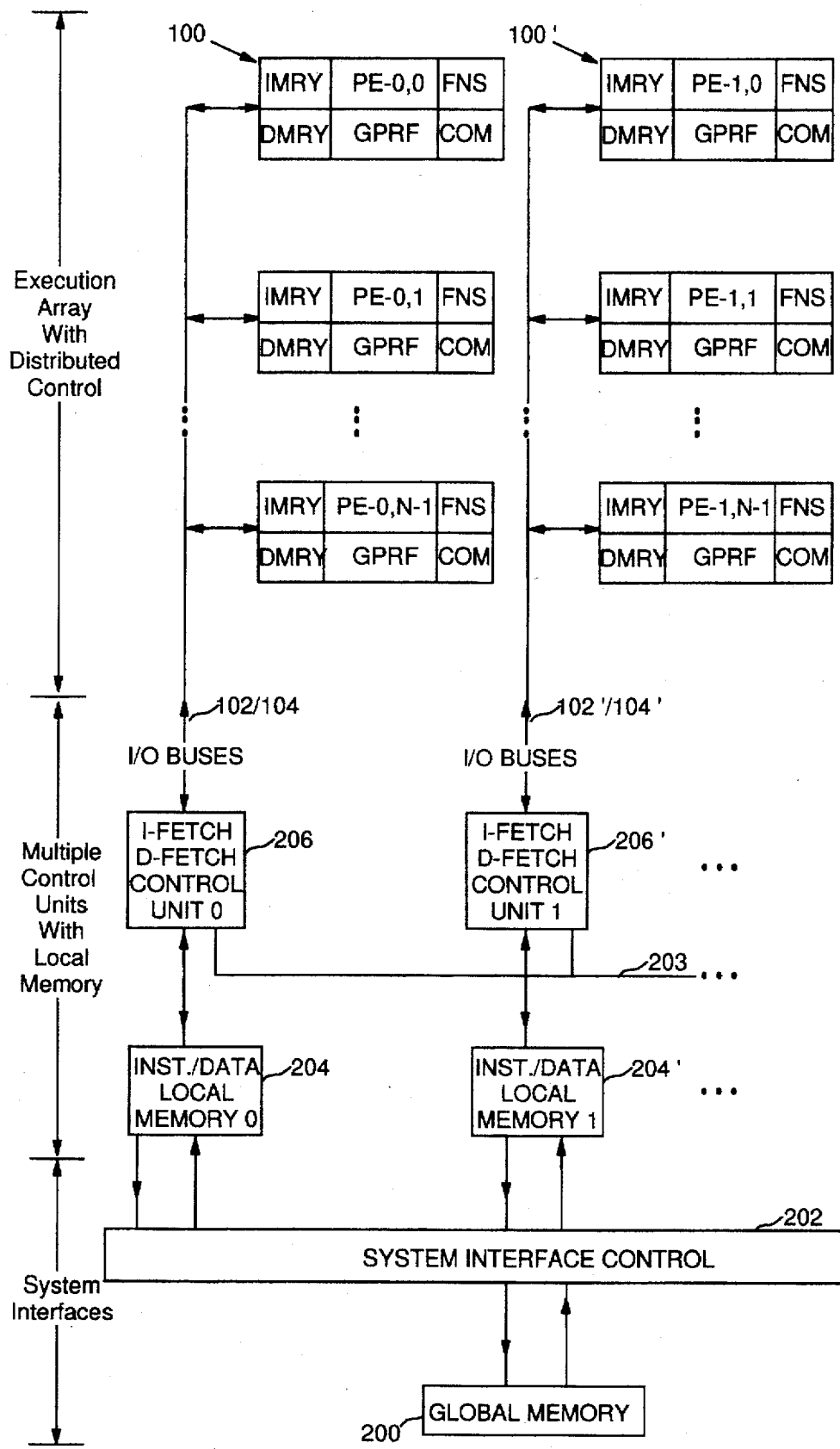
FIG 6-A

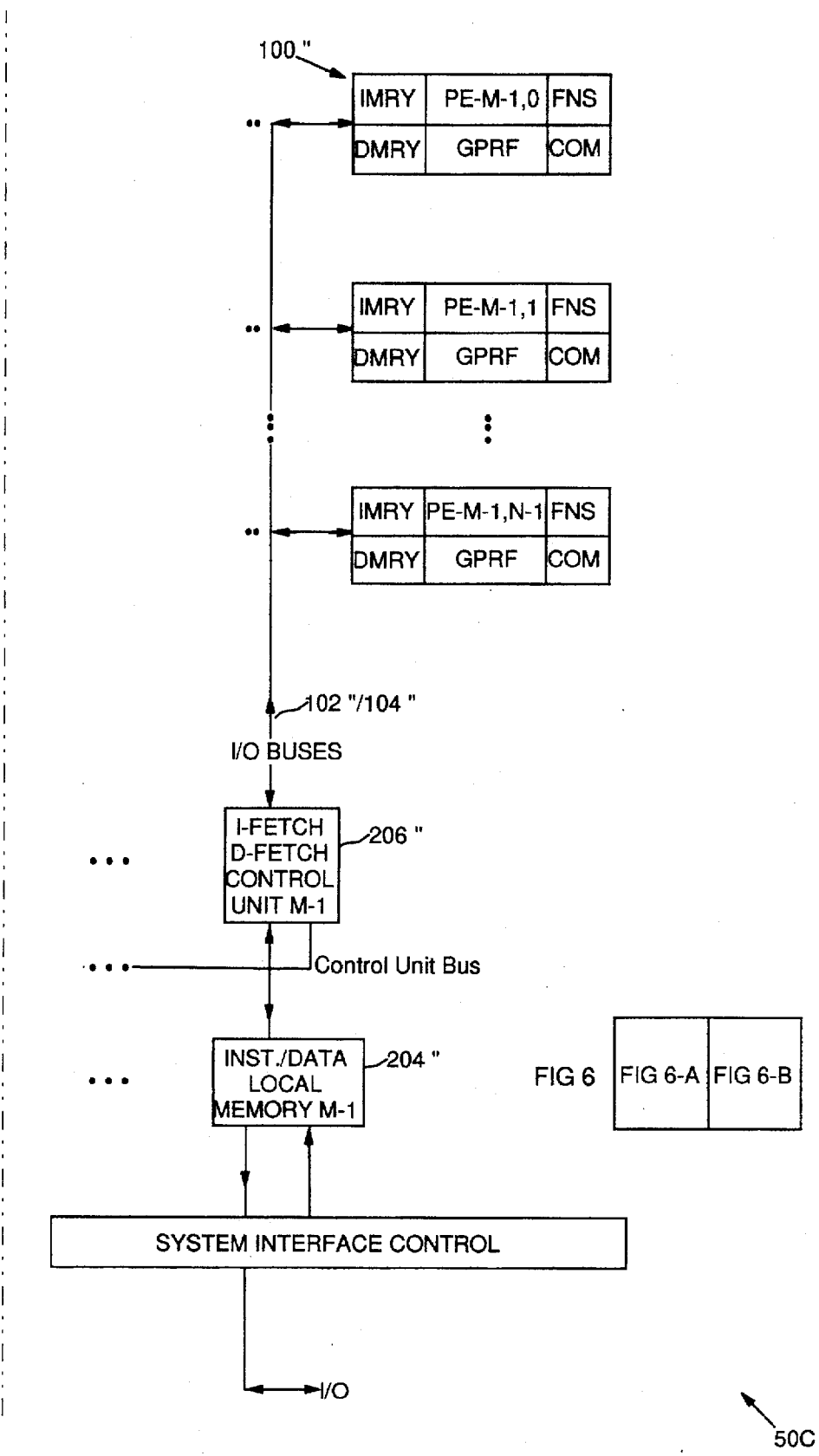
FIG 6-B

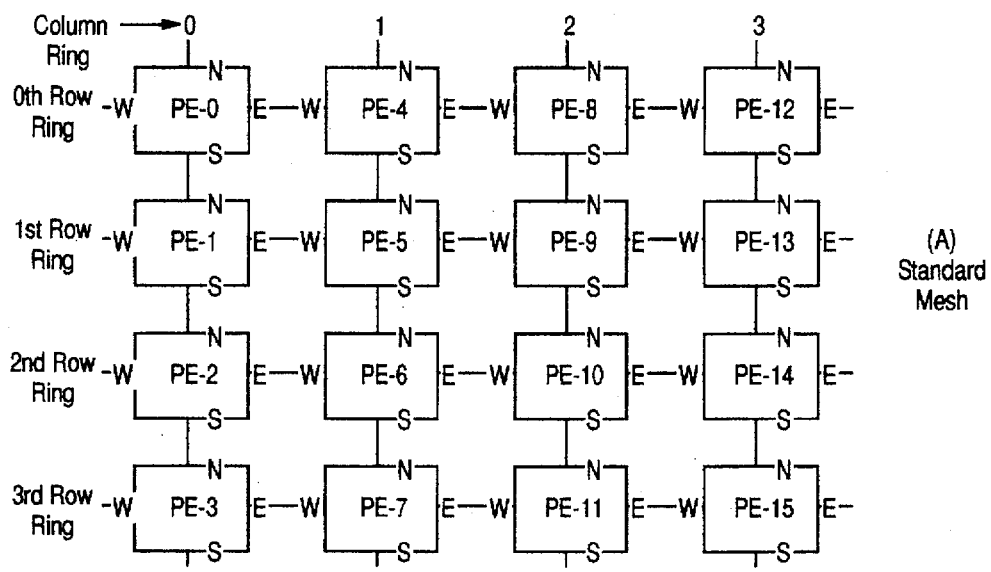
(A) Standard Mesh
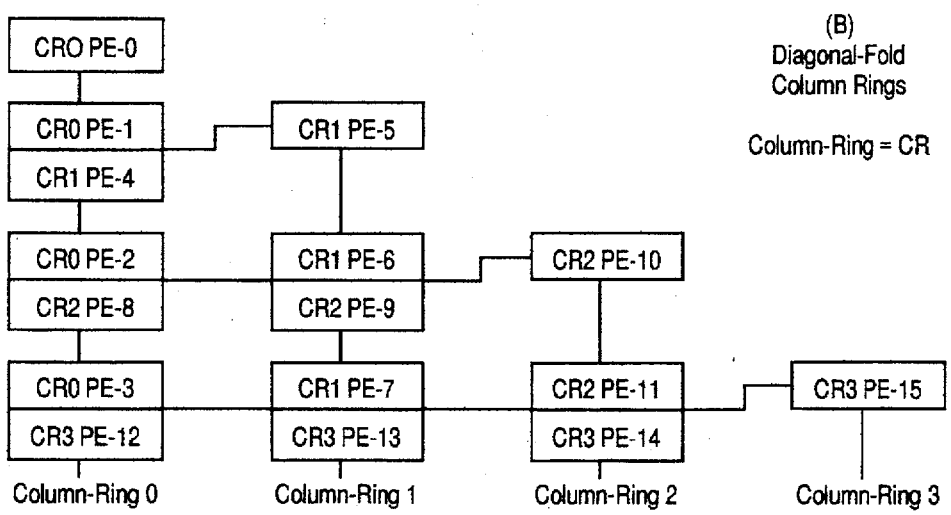
(B) Diagonal-Fold Column Rings
Column-Ring = CR
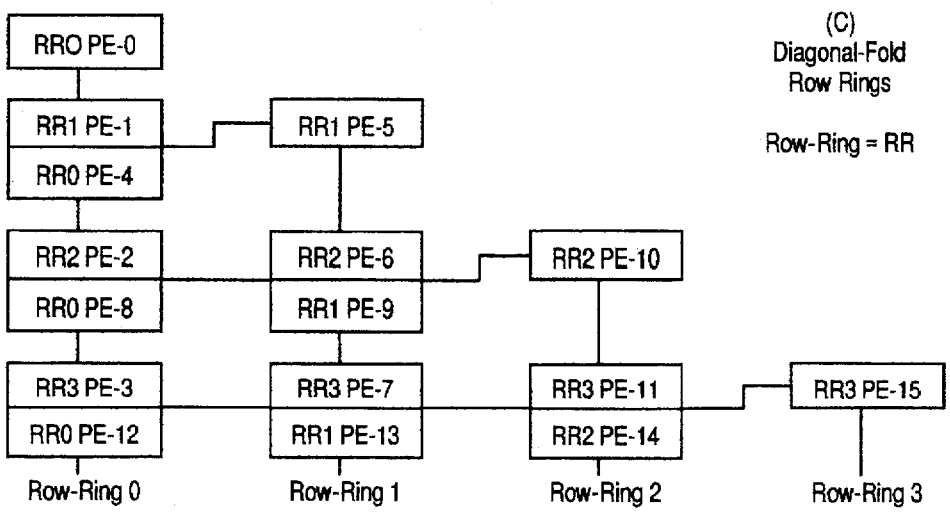
(C) Diagonal-Fold Row Rings
Row-Ring = RR
FIG 12

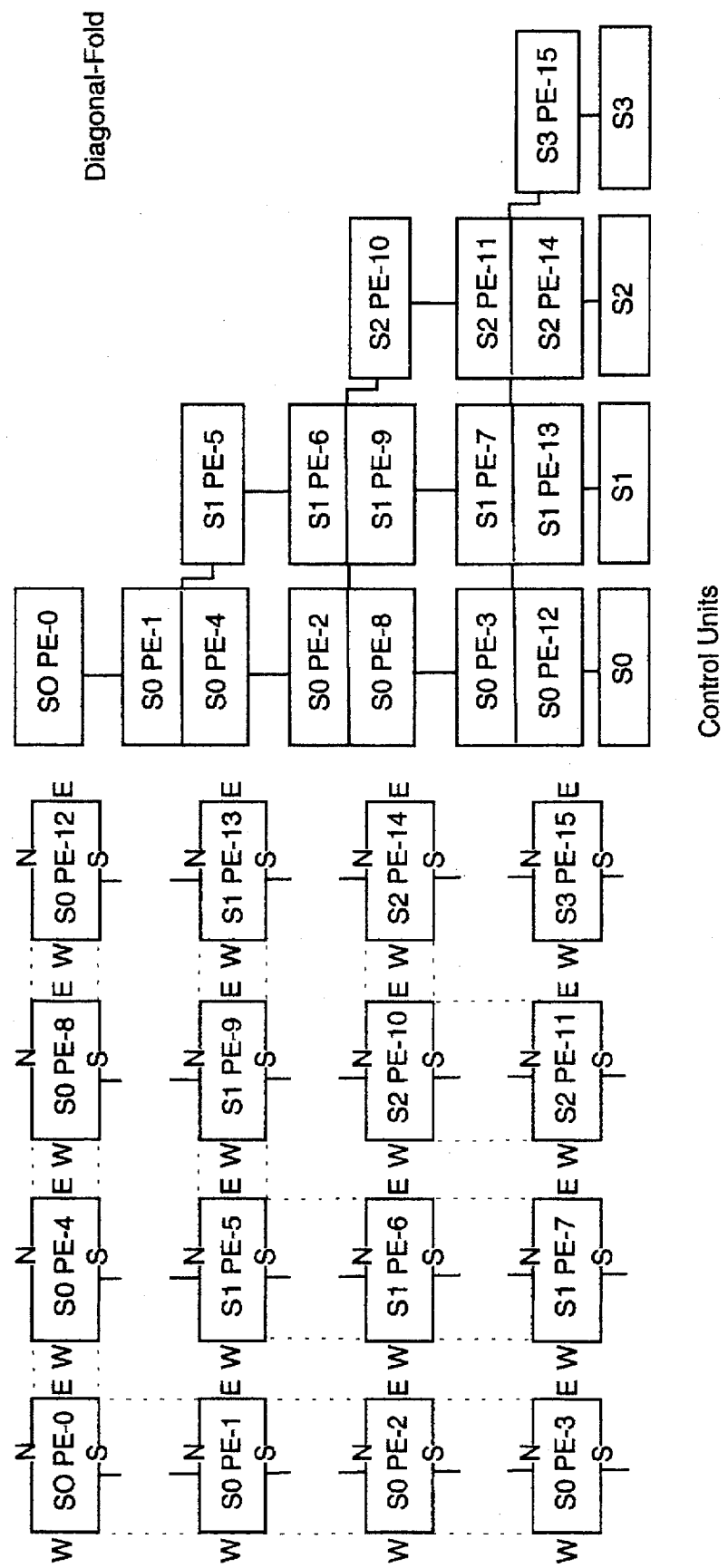
FIG 13-A

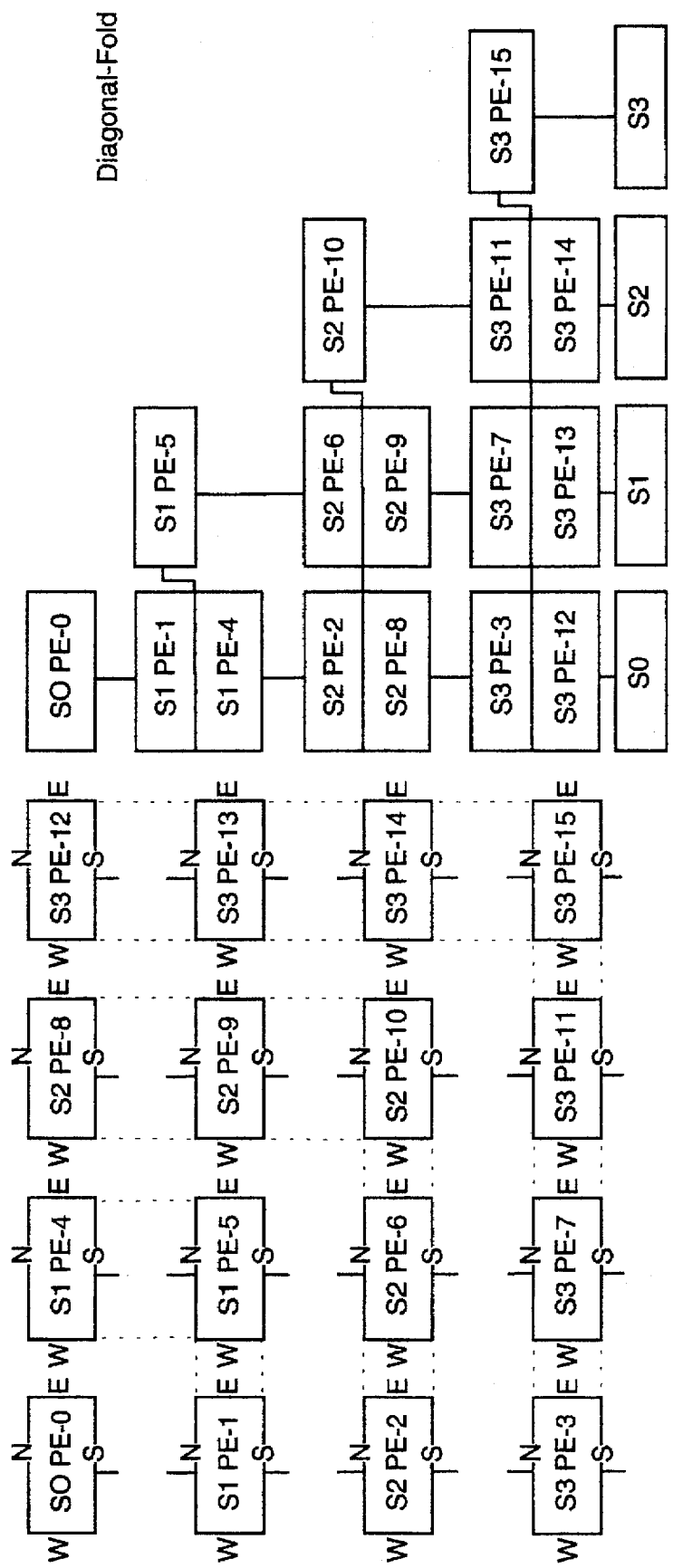
FIG 13-B

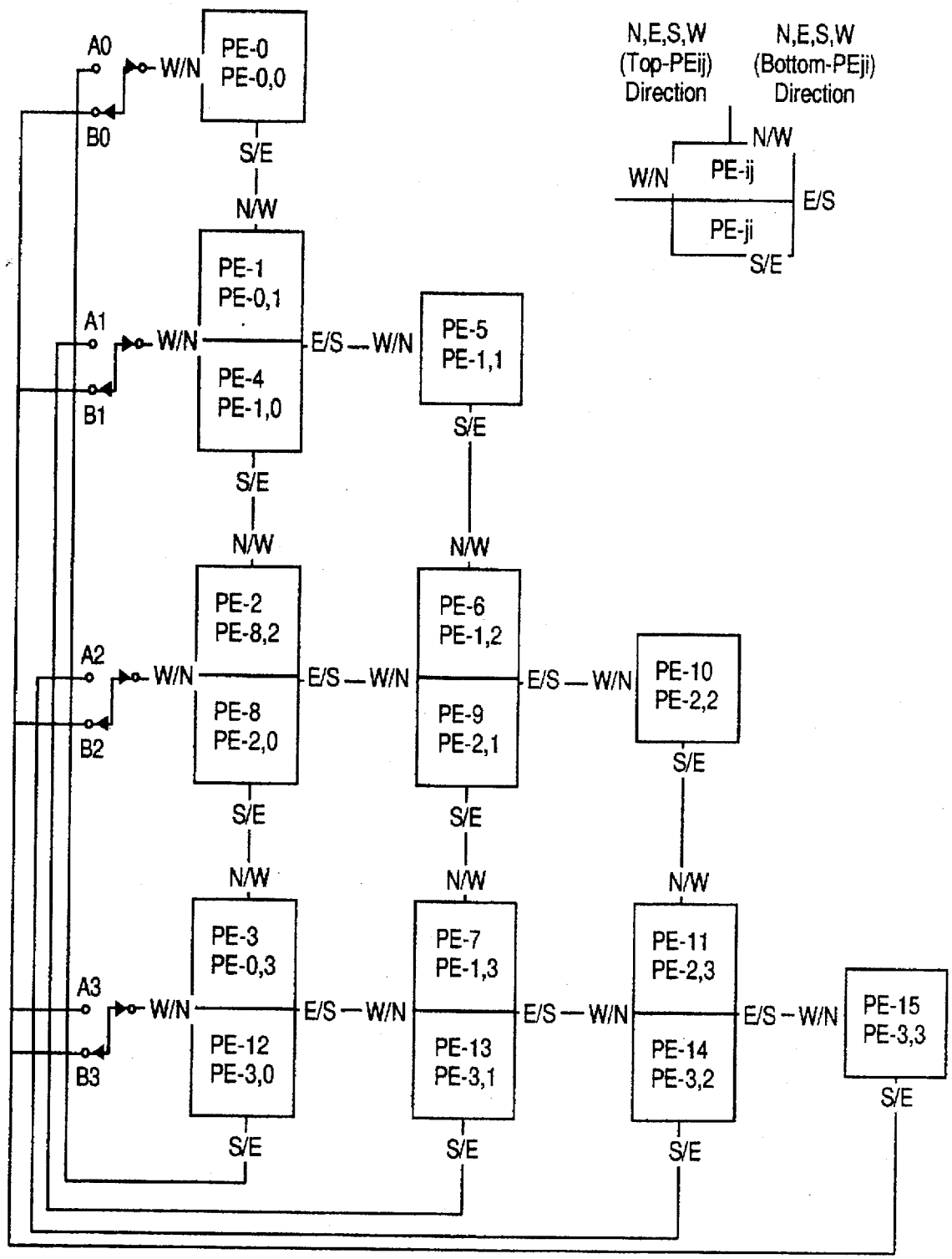
FIG16-A

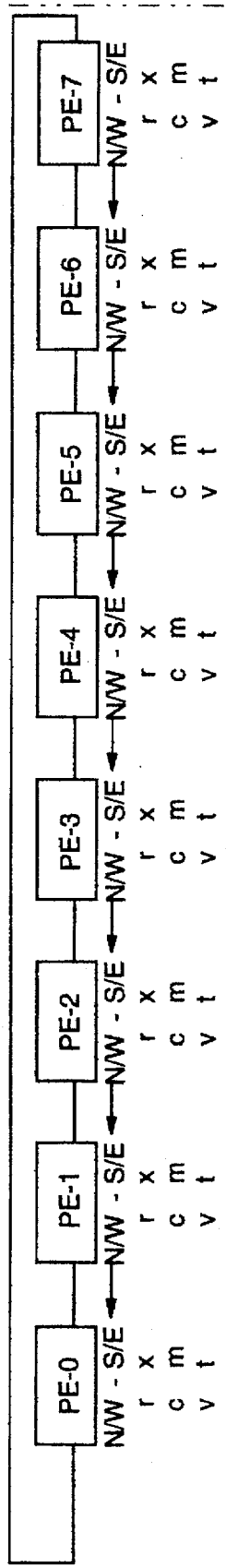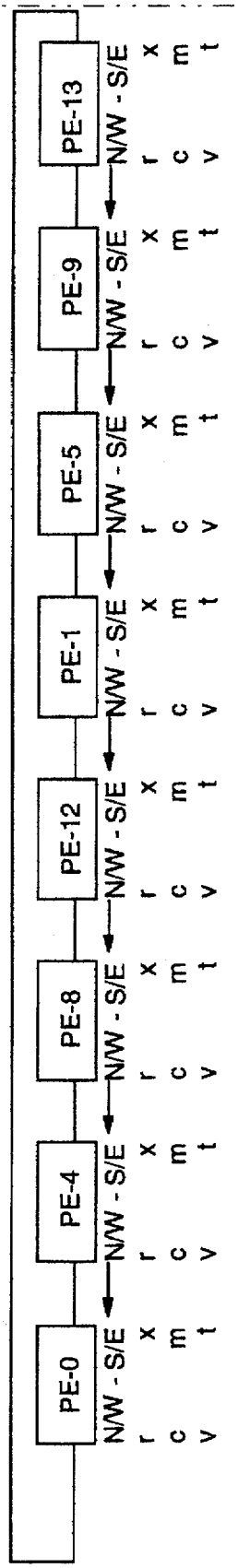
FIG 16-B-1

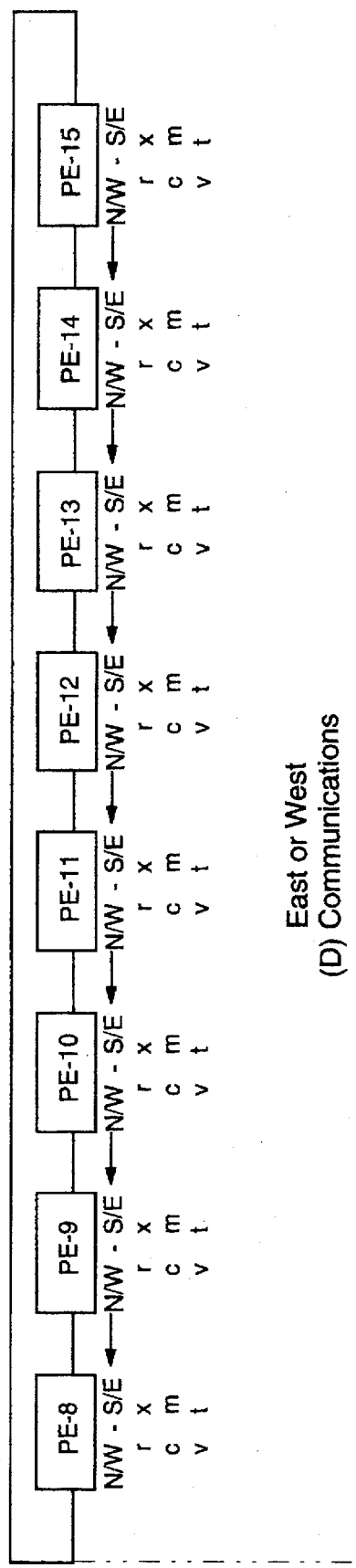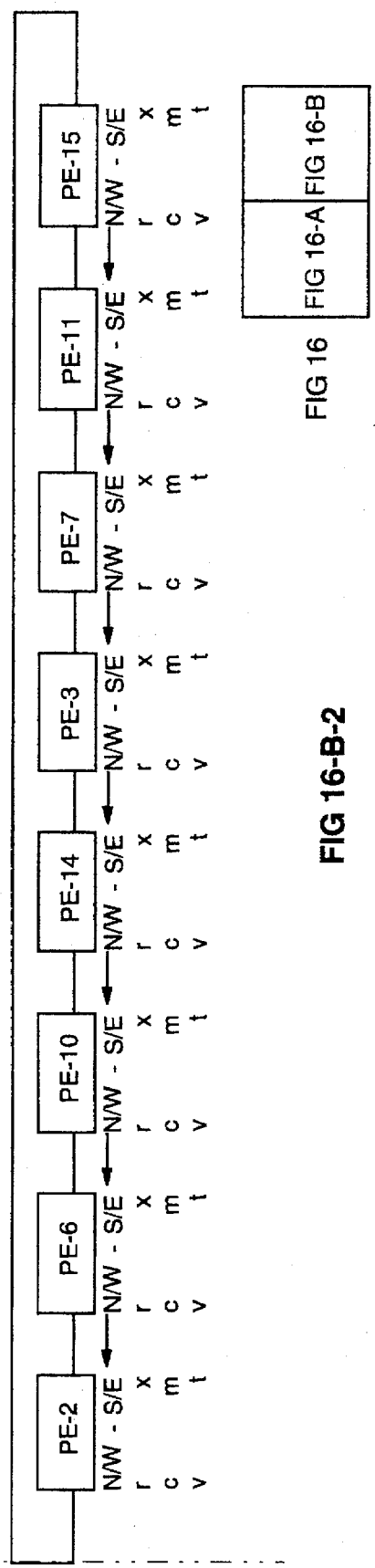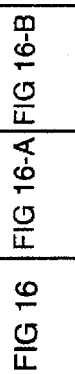
FIG 16-B-2

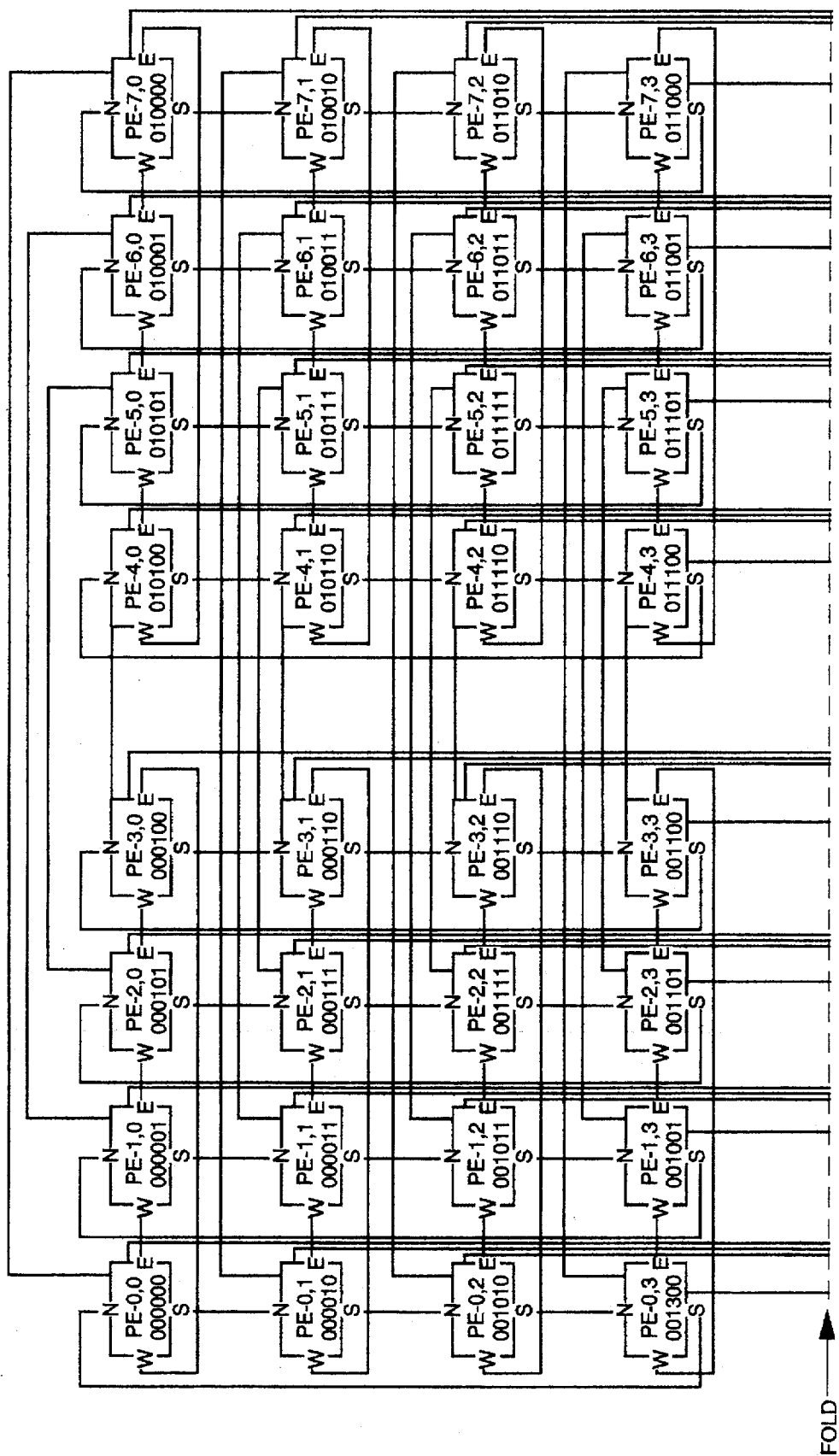
FIG 21-A

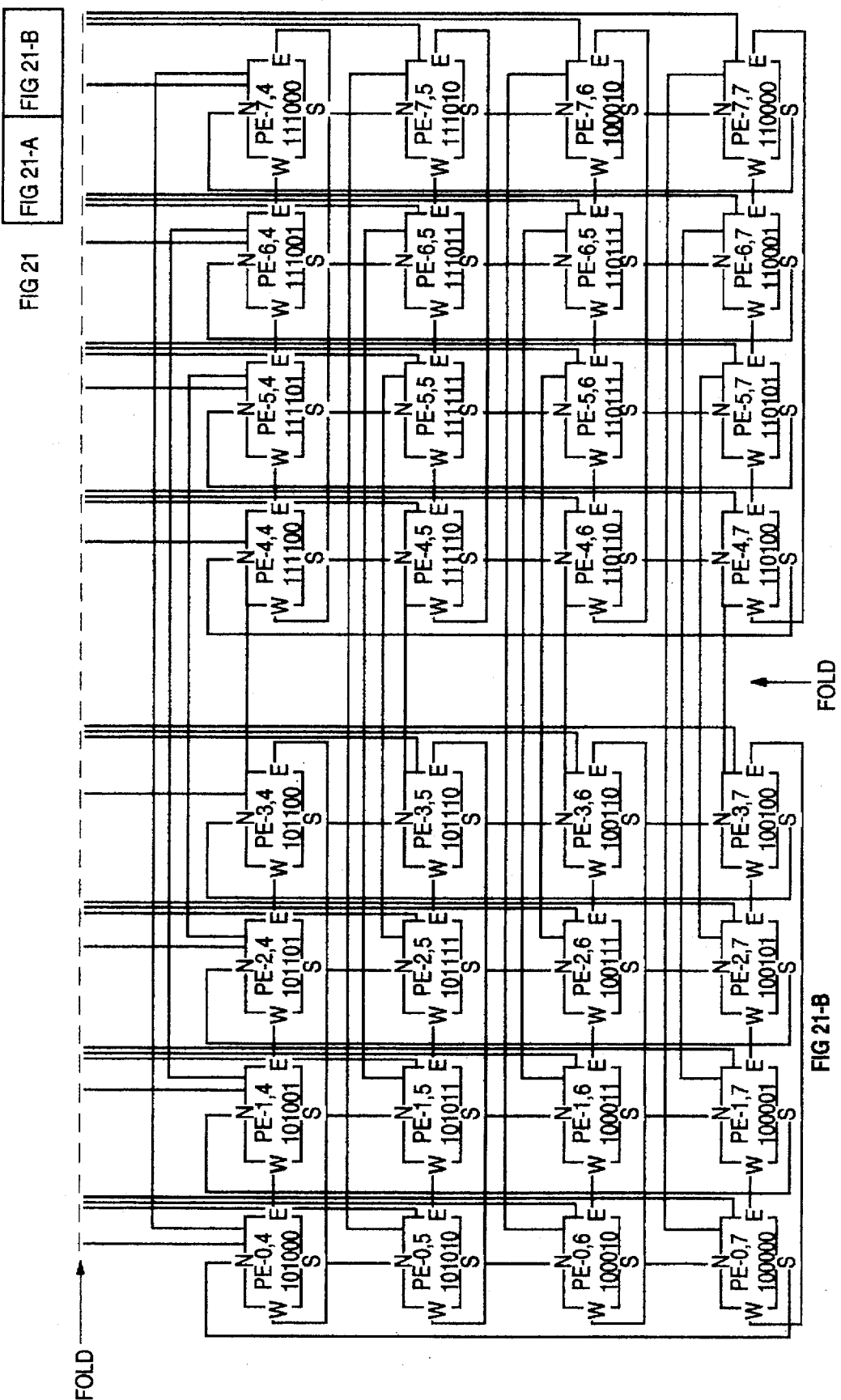

1

SELECTIVE PROCESSING AND ROUTING OF RESULTS AMONG PROCESSORS CONTROLLED BY DECODING INSTRUCTIONS USING MASK VALUE DERIVED FROM INSTRUCTION TAG AND PROCESSOR IDENTIFIER

RELATED PATENT APPLICATIONS

The invention disclosed herein is related to the invention described in the U.S. patent application Ser. No. 07/864,112, filed Apr. 6, 1992, by G. G. Pechanek, et at., now abandoned, entitled "Massively Parallel Array Processor", assigned to the IBM Corporation and incorporated herein by reference.

The invention disclosed herein is also related to the co-pending U.S. patent application by G. G. Pechanek, et al. which is entitled "DISTRIBUTED CONTROL PIPELINE WITH JOINT PE/SEQUENCER CONTROL", Ser. No. 08/365,858, filed Dec. 29, 1994, assigned to the International Business Machines Corporation, and incorporated herein by reference.

FIELD OF THE INVENTION

The invention disclosed broadly relates to data processing systems and methods and more particularly relates to improvements in parallel processing architectures.

BACKGROUND OF THE INVENTION

The workstation and personal computer marketplaces are very cost-sensitive, so traditional parallel processing approaches to achieve the required levels of performance in a programmable system have been avoided due to their high implementation costs. In addition, fixed-function application-specific designs tailored to specific niches in the marketplace were also not considered. Due to their fixed nature, these approaches lack flexibility as processing system platforms, limiting their potential utilization. What is required is a low-cost, scalable, programmable system with orders of magnitude performance improvement over existing uni-processor type systems. The Array Processor at the machine organization level represents a family of possible machines that achieves this goal. Multiple topologies for the parallel processing elements are reviewed with the preferred embodiment using a folded array organization. The folded array signal transform processor offers a single chip scalable parallel processing solution to the problems described earlier.

Due to their general nature, the proposed machine organizations, presented here, can be considered as the basis for a new class of digital signal processor architectures with wide-ranging potential applications.

OBJECTS OF THE INVENTION

It is an object of the invention to provide an improved programmable processor platform for image processing and image compression decompression algorithms.

It is another object of the invention to provide an improved programmable platform for video processing.

It is a further object of the invention to provide an improved parallel processing topology.

It is another object of the invention to provide a scalable data processing system having improved characteristics.

It is a further object of the invention to provide a parallel processing system which can be embodied with a minimum number of integrated circuit chips.

SUMMARY OF THE INVENTION

These and other objects, features and advantages are accomplished by the array processor topology reconfiguration system and method, disclosed herein. The system and method of the invention provide for the reconfiguration of a plurality of processor elements (PE) in a array processor, to dynamically change the interconnections of the PEs for outputting the arithmetic results of a first processor to the data input of a second processor in the array. This is accomplished by providing in each processor element an instruction decoder which decodes a compound instruction which is broadcast among all of the PEs. The compound instruction includes a tag portion and an opcode portion, the tag portion providing a personality for the interpretation of the opcode portion, depending upon the identity of the particular PE executing instruction. Each processor element includes an interconnection switch which is connected to a plurality of links between the PE and many other PEs in the array. In accordance with the invention, when the instruction is interpreted and executed by the PE, control signals are provided to the interconnection switch to enable the results computed by the processor element, to be selectively transferred to the data input of another selected processor in the array. The data input is provided to the next destination processor for immediate buffering in its general purpose register file. The identity of the particular storage location in the general purpose register file of the destination PE is included in the compound instruction that is broadcast away from all the PEs or alternately can be included in the information on the link connecting the processing element with the destination processing element.

In this manner, a large variety of interconnection topologies can be dynamically implemented during the course of a data processing session in the array of processing elements.

DESCRIPTION OF THE FIGURES

These and other objects, features and advantages will be more freely appreciated with reference to the accompanying figures.

FIG. 1 is a reduced instruction set computer, single instruction single data control flow.

FIG. 5 is a high level array machine organization single control unit, in accordance with the invention. FIG. 5 is divided into FIGS. 5A and 5B for convenience.

FIG. 6 is a high level array machine organization multiple control unit architecture, in accordance with the invention. FIG. 6 is divided into FIGS. 6A and 6B for convenience.

FIG. 12 illustrates column and row rings for processing elements that participate in the N=4 column rings and the N=4 row rings.

FIG. 13 illustrates an asymmetrical multi-processor. FIG. 13 is divided into FIGS. 13A and 13B for convenience.

FIG. 16 is a 16 processor element diagonal fold linear array. FIG. 16 is divided into FIGS. 16A and 16B. FIG. 16B is further divided into FIGS. 16B-1 and 16B-2 for convenience.

FIG. 21 is a six dimensional hypercube. FIG. 21 is divided into FIGS. 21A and 21B for convenience.

DISCUSSION OF THE PREFERRED EMBODIMENT

Figure 2:
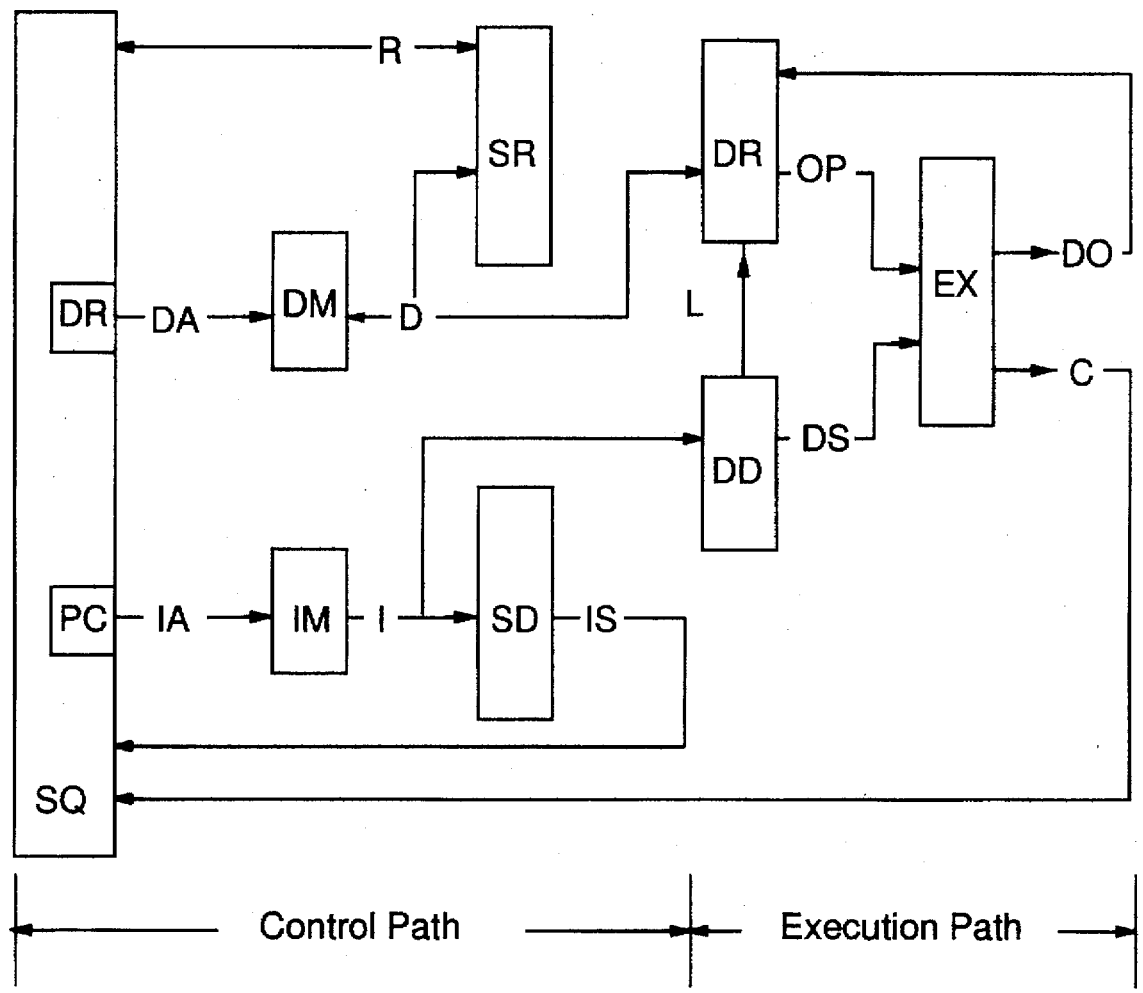
FIG. 2 is a reduced instruction set computer partitioned single instruction single data control flow.

Because existing approaches do not solve the stated set of problems, a new approach to providing a parallel system is proposed. The machine organization merges pipeline, array, and multi-processing techniques into a single cost effective structure, thereby creating a new class of digital signal processing architectures. This system uses:

1. A single simple Processing Element (PE) design that can be replicated and interconnected,
2. A single instruction-thread controller design that can be replicated and interconnected for the control of a set of processing elements,
3. A communication and control mechanism allowing the selection of different computational topologies of multiple processing elements with their controlling sequencer/s that match the expected algorithm domain providing multiple levels of parallelism and reconfigurability of the selected topology.
4. A scalable design allowing scaling of the computational topology, multiple Control Units with Local Memory, the number of instruction and data buses, the number and type of PE-to-PE communications, and the number of functional execution units in each PE.

(Scalability, for the purposes of this discussion, relates to the range of number of PEs, number of function execution units, number of control units, and memory sizes in the processing elements and control units that can be packaged on a single chip. This definition consequently is a technology dependent statement but one wherein the range of options grows with improved technologies. Nothing precludes the use of multiple chips in a system configuration.) This section describes the machine organization that provides these capabilities. In this section, the concepts supporting the processor control flow are described. The starting point for this description is a high level abstraction of a basic uni-processor model which is then expanded step by step into the basic control flow model. In the figures to follow, the basic block mnemonics are named in the figures with each figure including only the terms for the new blocks added, building upon the previous figures.

The basic RISC uni-processor Single Instruction Single Data (SISD) Control Flow model is shown in FIG. 1. In this figure, the basic blocks of the model shown are split into two basic sections; the Control Path and the Execution Path. As can be noted in the figure, the control path section includes part of the data path since, by definition for these models, control instructions, e.g. Loads and Stores, are the only means of moving data between data memory and the processor. This Load/Store architecture feature is maintained throughout the various models to be discussed. In addition, all models are of the Harvard architecture type with separate Instruction Memory (IM) and separate Data Memory (DM). The memory is treated as a single block even though it may represent a memory hierarchy. Separate memory addressing mechanisms are provided for each memory, namely a Data Address generator (DA) and a Program Counter (PC). The Program Counter generates addresses to Instruction Memory using a sequential addressing model, modifiable by control instructions of the branch or jump type and also by interrupts. Addressed instructions are fetched from the Instruction Memory and decoded (ID) generating the control state signals (IS) and Data Signals (DS). The next state of operation is then determined by the Sequencer (SQ) based in part upon the decoded Instruction Signals (IS) and Condition Signals (C) generated in the Execution Path. Fetched Execute Unit (EX) instructions are decoded (ID) generating Data Signals (DS) for control of operand fetching and execution. The operands are fetched from a General Purpose Register file (GR) by a selection function, e.g. read ports, and provided to the Execution Unit from which Data Outputs (DO) and Condition Signals (C) are generated.

Functional blocks of the Basic RISC SISD model shared between the Control Path and the Execution Path can be separated creating the RISC Partitioned SISD model. The RISC SISD model in FIG. 1 is modified as follows. First, it is realized that the Control Path usage of the register file can be independent of the Execution Path if independent execution means are provided in the sequencer in support of address generation functions. For performance reasons, this type of support is many times provided to allow the address generation function to operate concurrently with the data execution function. Consequently, the General Purpose Registers (GR) of FIG. 1 can be split into two independent separate register files labeled in FIG. 2 as Sequencer General Purpose Registers (SR) and Data Path General Purpose Registers (DP). Second, the Instruction Decode logic can be split into two independent units, namely, the Sequencer Instruction Decode logic (SD) and the Data Unit Instruction Decode logic (DD). Additional controls are needed to differentiate Control Path and Execution Path instructions and data. These controls can be obtained from the instruction opcodes and by means of program control, e.g. though register file specific Load/Store instructions. The other operations of the basic control flow remain as described for the model shown in FIG. 1.

Figure 3:
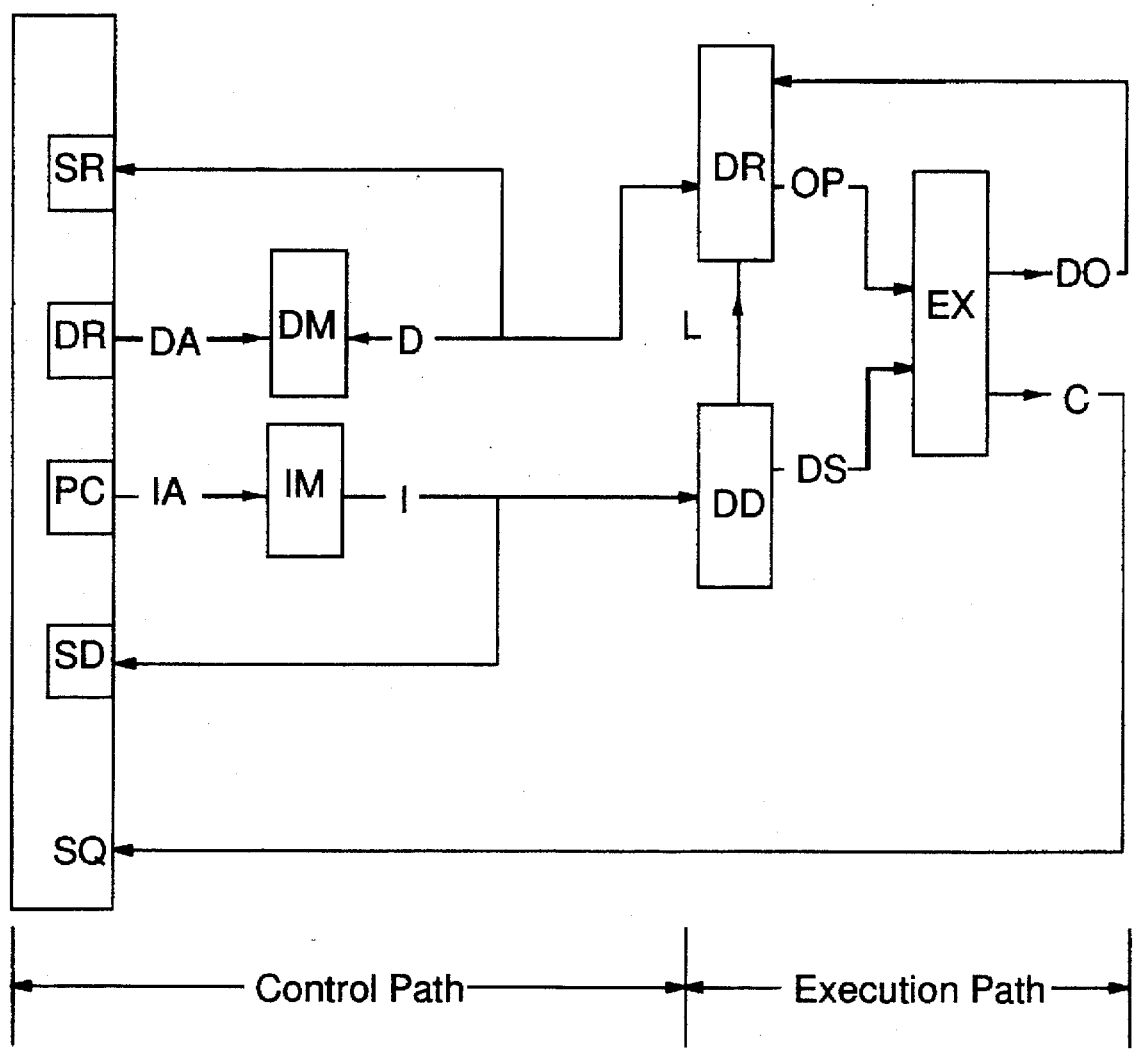
FIG. 3 is a simplified reduced instruction set computer partitioned single instruction single data control flow.

For the purposes of the present discussion, the RISC Partitioned model, FIG. 2, can be simplified by moving the Sequencer General Purpose Registers (SR) and Sequencer Instruction Decode Logic (SD) to the sequencer, FIG. 3.

The Execution Path of FIG. 3 can be expanded as follows: By including Very Long Instruction Words, multiple "unique" execution units are provided in each PE. For an example, the functional units can consist of single or multiple Multiplier/s, an ALU/s, a shift function/s, a pass through port allowing access to register file data, as well as other functions. By including the communication architecture in the mesh machine organization, an interconnection switch is added in each pe to facilitate the communications between the processing elements. In addition, local data memory and local instruction memory can be added as depicted in FIG. 4A. FIG. 4A can be abstracted into a simplified symbol as shown in FIG. 4B where IMRY corresponds to the Instruction Memory (inst. memory), DMRY corresponds to the DATA Memory, GPRF corresponds to the General Purpose Register File including Input Multiplexer (MPX) and output Selector, FNS corresponds to the functional execution units FN1, FN2, . . . , Fnx, and the communications function COM corresponds to the Local PE Interconnection Switch Network including the Instruction and Data Bus switches used in the clustered PEs, see FIG. 10 for example. The communications (COM) function receives results from the functional units and GPRF and provides a selection and interconnection mechanism to a set of links within the interconnection switch network. This COM function provides the means for interfacing the GPRF and the arithmetic elements with neighboring PEs via the Links. The COM function also provides the connecting interface to the control units local memory subsystem. By providing local data memory reference instructions, each PE can store and operate on large quantities of data local to each processing element. The local instruction memory provides support for fine grain Multiple Instruction Multiple Data (MIMD) operations.

The Control Path of FIG. 3 can be represented by the block labeled I-FETCH, D-FETCH, Control Unit 0 in FIG. 5A. The Instruction and Data memory can be represented as a single block in FIG. 5A assuming additional read and write ports for use by a System Interface Control for moving data between the Local Control Unit Memory and Global Memory. This simple model is now used to construct multiple topologies of processing elements.

FIG. 5A, FIG. 5B, and FIG. 6 depict three high level views of possible machine organizations with single and multiple control units. Each machine organization is partitioned into three main parts: the System Interfaces including Global Memory and external I/O, single/multiple instruction-thread Control Units with Local Memory, and the Execution Array with Distributed Control PEs. The System Interface is an application-dependent interface through which the Control Units (also referred to as sequencing processors or sequencers) interface with Global Memory, the I/O, other system processors, and the personal computer/workstation host. Consequently, the System Interface will vary depending upon the application and the overall system design. The Control Units contain the Local Memory for instruction and data storage, instruction fetch (I-Fetch) mechanisms, and operand or data fetch mechanisms (D-Fetch). The Execution Array with Distributed Control PEs is a computational topology of processing elements chosen for a particular application. For example, the array may consists of N Processing Elements (PEs) per control unit, with each PE containing an Instruction Buffer (IMRY), a Data Buffer (DMRY), a General Purpose Register File (GPRF), Functional Execution units (FNS), Communication Facilities (COM), and interfaces to its Instruction/Data buses. Further, each PE contains an instruction decode register which supports distributed control of the multiple PEs. Synchronism of local memory accessing is a cooperative process between the control units, local memories, and the PEs. The array of PEs allows computation functions (FNS) to be executed in parallel in the PEs and results to be communicated (COM) between PEs. FIG. 5A depicts a uni-processor structure made up of a single PE and a single control unit. FIG. 5B shows a single control unit Execution Array Processor that operates as a Single Instruction Multiple Data (SIMD) type of machine. FIG. 6 presents a multiple instruction-thread Multiple Single Instruction Multiple Data (MSIMD) machine, which also supports a single instruction-thread SIMD array mode of operation.

With the MSIMD machine Organization FIG. 6, it is possible to create single and/or multiple thread machines wherein the topology of PEs and communication facilities can be configured for a more optimum organization depending upon the application. For example, some possible machine organizations are; multiple linear rings, a nearest neighbor 2-dimension mesh array, a folded nearest neighbor 2-dimension mesh, a 2-dimension hexagonal array, a folded 2-dimension hexagonal array, a folded mesh of trees, combinations of the above as well as others. This collection of heterogeneous machine organizations, with the ability to be configured separately or with mixed topologies, allows great flexibility in system design. In addition, the architecture supported in each topology of PE can be varied depending upon the application requirements. Control of the mixed topologies and varying PE architectures can be done in a program independent manner through the use of network start and network stop program constructs. The programmer would specify the start of a network, the operational code for that network, and a stop network identification. Code can then be loaded in the independent networks and executed in parallel. Hardware facilities supporting this can be accomplished through the use of mode/status lines in each network. For example, a possible system configuration for image compression/decompression processing could be to place on the same chip a block search motion estimation processor with a 2-D DCT/IDCT processor. The motion estimation processor could be configured as mesh-of-trees topology using a subset PE architecture while the 2-D DCT/IDCT processor could be configured as a folded-mesh using a different PE architecture than used in the mesh-of-trees processor.

An allowable extension to the PE and control unit architectures is support for fine grain Multiple Instruction Multiple Data (MIMD) parallel operation. In the SIMD approach all PEs execute the same instruction in parallel and in synchronism on different data. In general, for SIMD execution the PEs do not independently execute branch, load, or store instructions; they merely execute computational and communication type instructions. In the fine grain MIMD approach, each PE contains its own instruction and data memory with PE branch/load/store instructions independently executable within a PE's own local memory. Various levels of independent control can be architected within a fine-grain MIMD type system. For example, a system can be architected which allows MIMD processing within PEs but uses only SIMD communication mechanisms between PEs and sequencer's local memory.

With a SIMD auto-loop instruction/s the branching mechanism in each PE is defined at the instruction-thread controlling point. An auto-loop set of PE instructions would contain the restriction that within the loop no conflicting PE-to-PE communication or PE to control unit memory load/store instructions are allowed. The instructions in each PE can be independent, meaning that each PE executes an auto loop of a different instruction stream contained in their instruction buffers and operates on data contained in their data buffers. At the end of the auto-loop, standard SIMD communications between PEs and control unit memory can be used. Since independent PE programs would not necessarily be of the same length, the longest PE program would determine the loop length with shorter programs padding with no-operation instructions or provided with other non-conflicting PE processing tasks that fit within the allocated auto-loop processing time. This represents another level of parallelism achievable by the array machine organization.

There are a number of PE architecture features that are application and technology dependent. These are listed as follows:

PE topology, number of links, and the number of PEs,
PE communication facilities in support of chosen PE topology,
data types supported (byte, half-word, word, etc.),
PE register and bus widths for supported data types, \
Number of PE registers, Number, type, and control of multiple Functional units (FN1, FN2, ..., FNx),
Data Buffer size,
Support of fine grain MIMD mode (where an instruction Buffer and sequencer logic is required in each PE).

Figure 7:
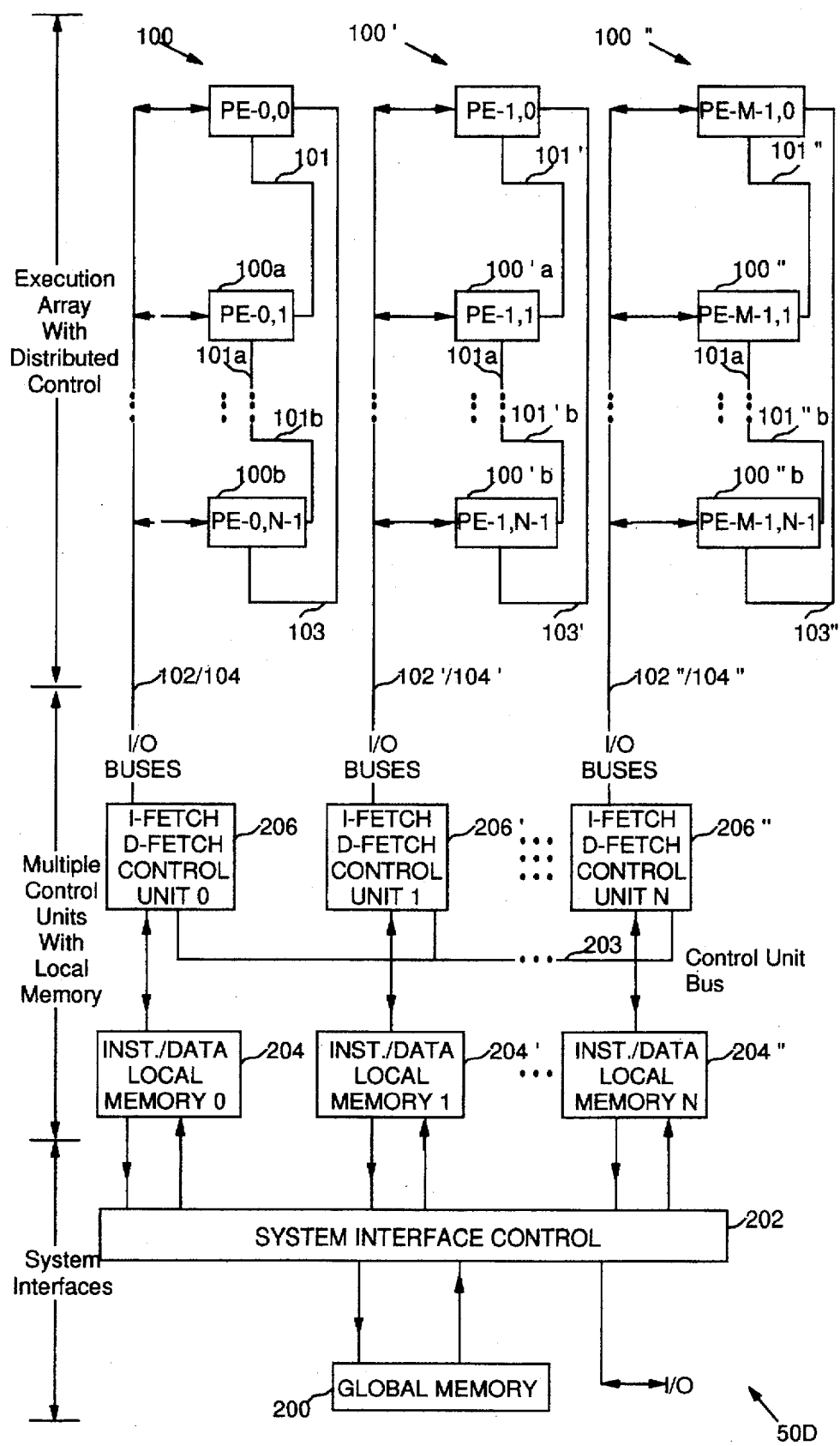
FIG. 7 is an N linear ring machine organization.

Multiple linear rings of PEs can be provided through the use of two communication links per PE as shown in FIG. 7. N PEs are shown interconnected to M control units allowing M concurrent instruction-threads to be in operations while N simultaneous operations are occurring in each thread.

Figure 8:
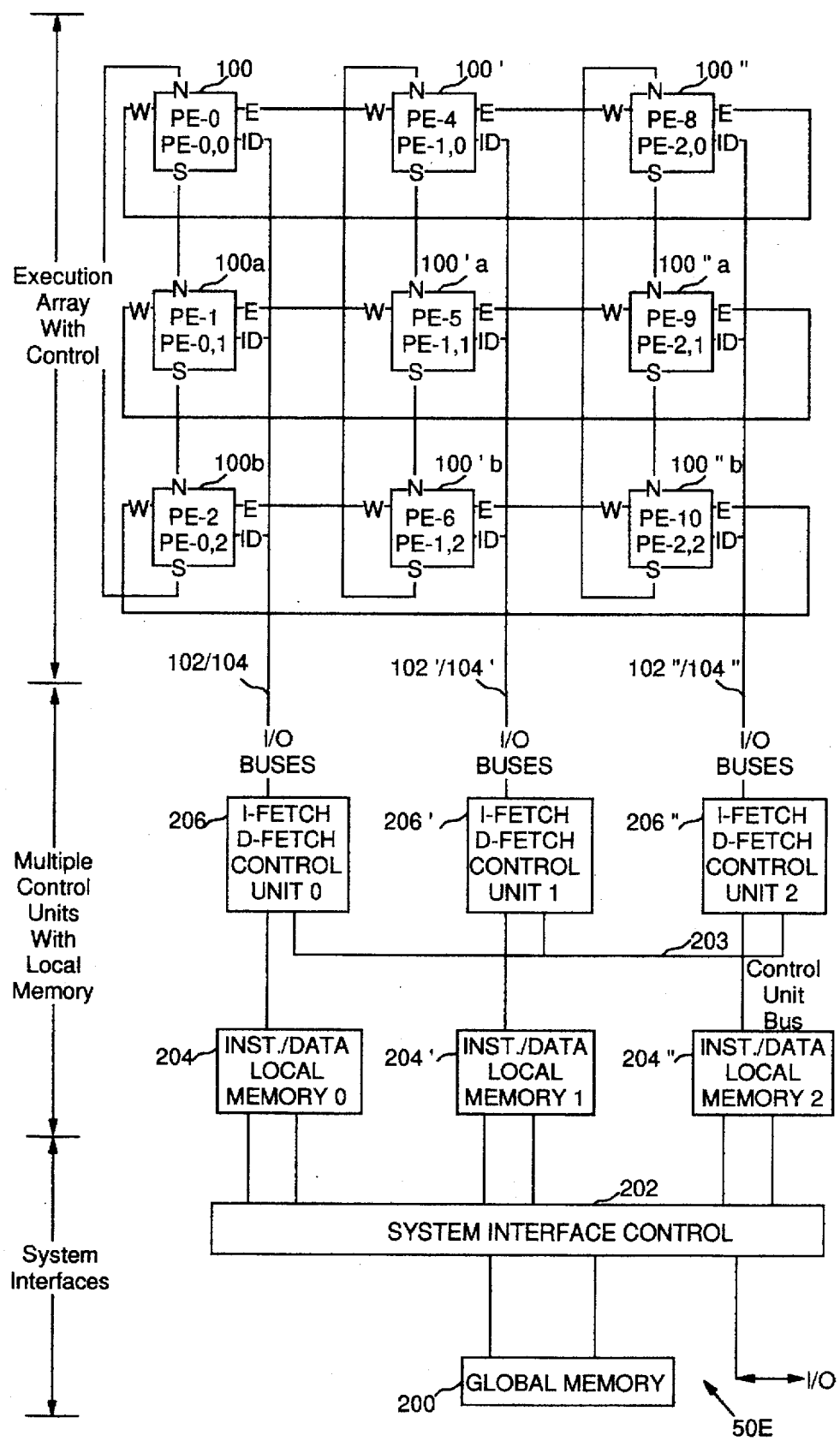
FIG. 8 is a four-neighborhood 3×3 mesh machine organization example.

A 3×3 nearest neighbor mesh bus connected array of processing elements is shown in FIG. 8. Contained in this machine organization are, in general, M×N processing elements (PEs) connected to their north, south, east, and west neighbor PEs. Our structure, as shown, uses N instruction/ data broadcast buses. Bus and nearest neighbor communications are controlled through the instruction set architecture. Six and eight neighborhood arrays are natural extensions to this structure. In FIG. 8, the processing elements are labeled as $PE_{ij}$ where "i" denotes the matrix column and "j" denotes the matrix row. Each $PE_{ij}$ contains four interface ports labeled North (N), East (E), South (S), and West (W). The total number of nearest-neighbor wires in the mesh-connected computer with wraparound connections, e.g. FIG. 8, is $2M^2(L)$, where L is equal to the number of interconnection wires between adjacent PEs. Under the simplifying assumption of uni-directional nearest neighbor communications, it can be noted that during any transmission in the standard mesh configuration FIG. 8, only 50% of the PE interfaces are utilized. To achieve the same functionality and performance as the mesh connected computer with half the number of interconnection wires, a savings of $M^2(L)$ wires with corresponding savings in chip real estate, the diagonal-fold mesh computer organizations have been proposed as described in the above-cited G. Pechanek, et al patent application. By applying this diagonal-fold concept to the N×N nearest neighbor mesh bus array results in the diagonal-fold organization shown in FIG. 9 for the N=4 case.

The diagonal-fold organization of PEs is achieved by folding the square mesh along the $PE_{ii}$ diagonal elements. This folding operation places the symmetric PEs, $PE_{ij}$ with $PE_{ji}$ into a dual PE arrangement, symbolically shown in FIG. 9 in a top $PE_{ij}$ and bottom $PE_{ji}$ configuration. The symmetric PEs share transmission and reception ports where $PE_{ij}$'s W, S, N, and E ports are shared with $PE_{ji}$'s N, E, W, and S ports respectively. The shared ports are indicated with the following notation: (top PE direction port label)/(bottom PE direction port label). The total number of diagonal-fold mesh array wires has been demonstrated to be exactly half the number of wires required by the standard square mesh organization. The instruction and data buses connect to the dual PEs through a switch interface. This dual PE switch allows the top and bottom PEs to interchange bus interfaces.

The array processor invention can be more particularly understood by referring again to FIGS. 4 and 5. For example, it can be seen that FIG. 5A shows a uni-processor configuration 50A and FIG. 5B shows an execution array processor 50B. The global memory 200 in FIG. 5B can store the instructions and the data to be applied to the array 50B. The system interface control 202 will provide the instructions and data to the instruction/data local memory 204.

Figure 24:
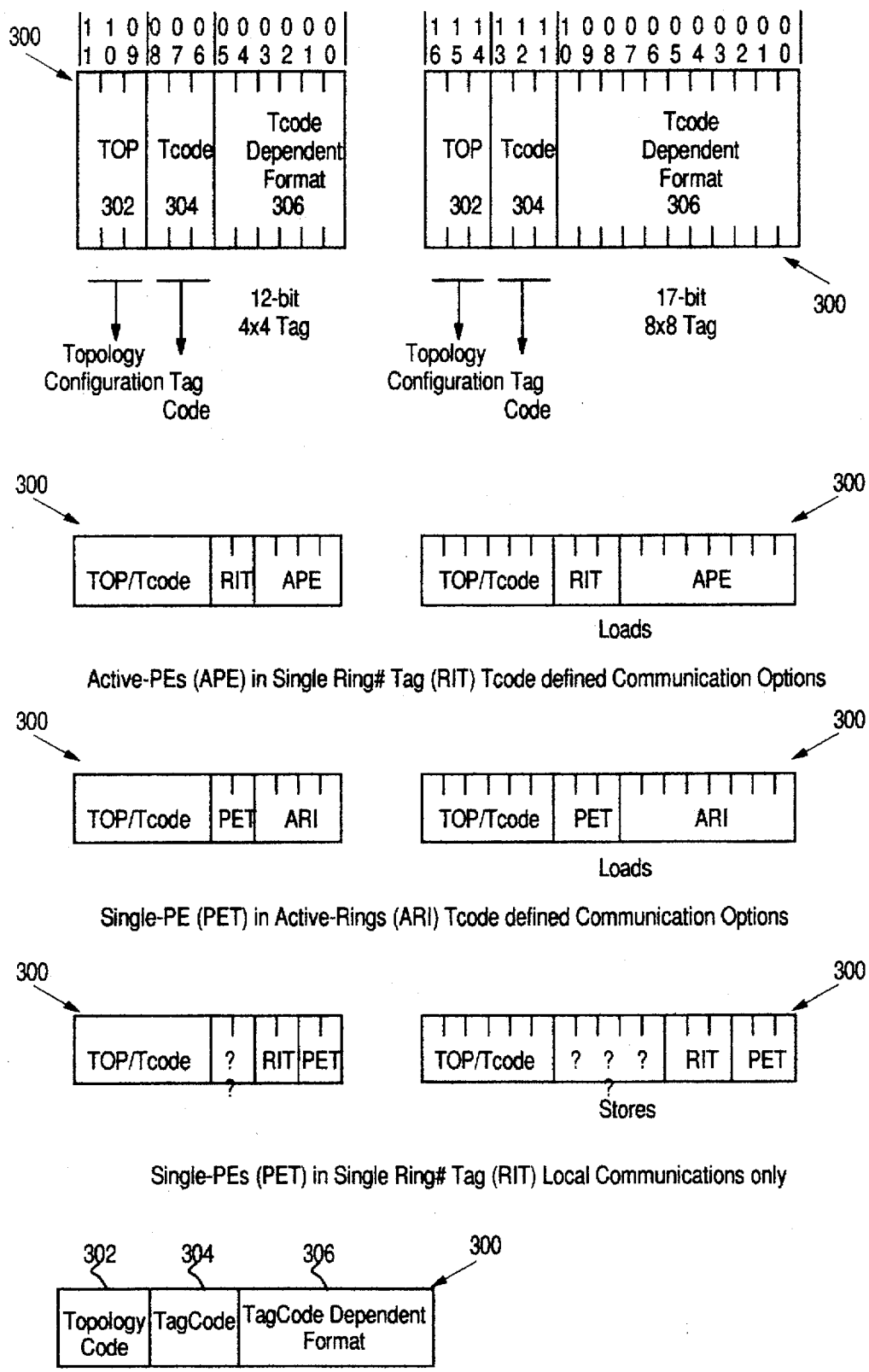
FIG. 24 shows the instruction format.

Alternately, instructions can solely come from the global memory 200 and data can be provided on the I/O connection 201 from a realtime data source. The control unit 206 is a processor sequencer control unit which is coupled to the local memory 204, for fetching instructions or both instructions and data from the local memory 204. An example of the instruction tags suitable for controlling the array 50B is shown in FIG. 24. Instruction tag 300 is shown having a tag portion 304, an opcode portion 306 and a topology configuration portion 302.

Figure 4:
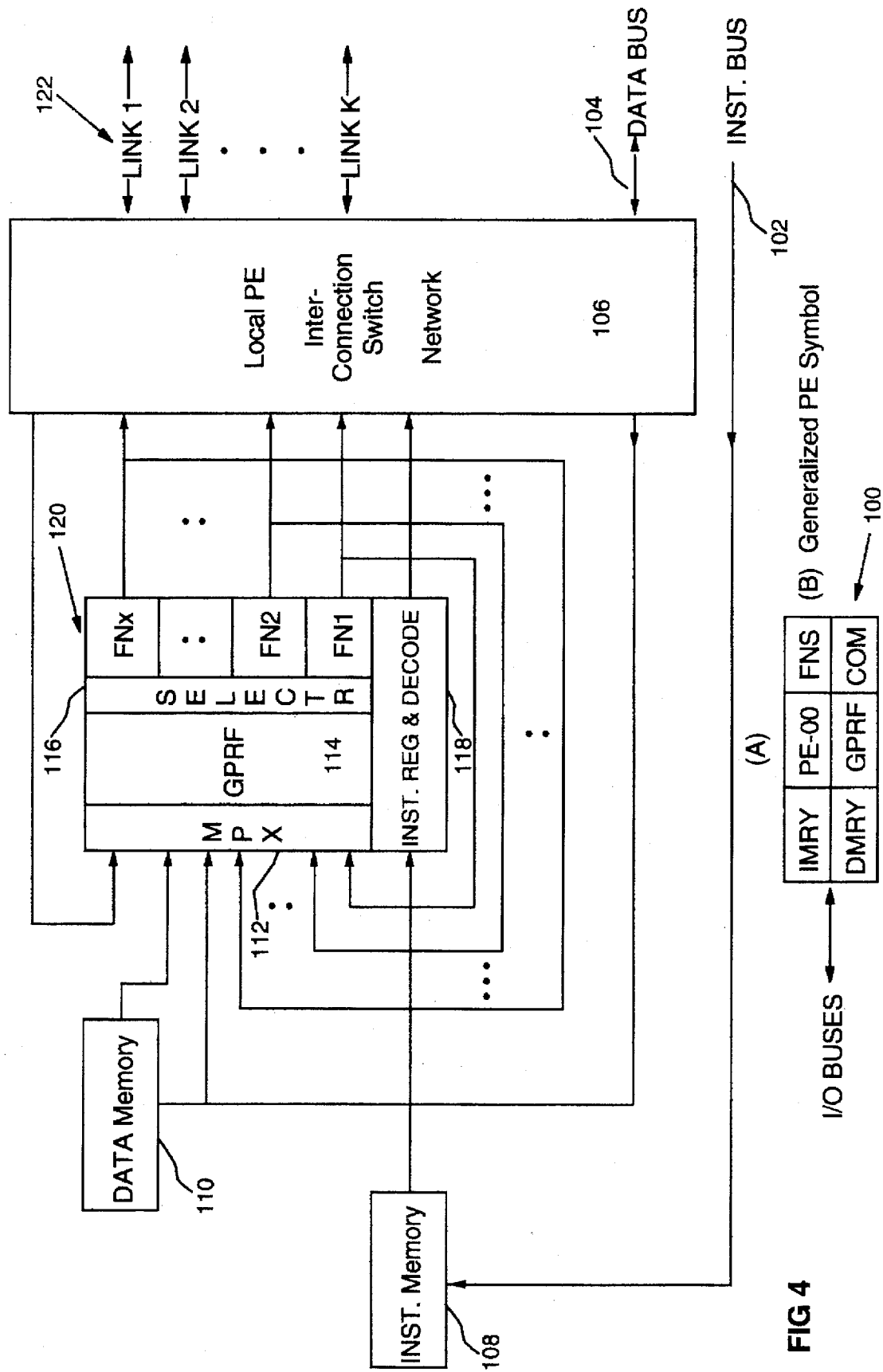
FIG. 4 is a generalized processing dement A and its symbol B.

The execution array processor 50B of FIG. 5B includes a plurality of processor elements including the processor element 100 which is shown in greater detail in FIG. 4. Processor element 100 is connected to the control unit 206 by means of a data bus 104 and an instruction bus 102. Each processor element 100 in the array 50B has a unique identity value, for example processor 100 has the identity value PE0,0, whereas processor 100' has the identity value of PEM-1,0, for example. Reference to FIG. 4A will show that each processor element 100 includes inter-processor links 122 which connect the processor 100 to other processors in the array 50B.

For example, second processor element 100' in FIG. 5B is coupled to the first control unit 206 by means of the first data bus 104 and the first instruction bus 102. The second processor element 100' has a second unique identity value PEM-1,0. The second processor element 100' has also has inter-processor links 122 which interconnect it with other processor elements in the array 50B. The links 122 can be bi-directional links, thereby enabling a first processor to receive result data from a preceding processor and then to deliver result data from its own computations to a subsequent processor element in the array over either the same link or over separate links, for example link 1 and link 2 shown in FIG. 4.

The processor 100 in FIG. 4A has an instruction memory 108 connected to the instruction bus 102, the output of the instruction memory 108 being connected to an instruction register and decode 118. The instruction register and decode 118 takes an instruction and its tag 300 shown in FIG. 24 and combines the tag value with the processor identity for the processor element 100, to obtain a result mask value used to interpret the opcode in the instruction. Tcode 304 defines the meaning of the tag code dependent format field 306. Top 302 in conjunction with 306, along with the opcode in the instruction, when interpreted by the instruction decode 118, provides control signals to the general purpose register file 114 to selectively store data which arrives on the data bus 104. The control signals output from the instruction decode 118 also enable one or more of the arithmetic elements 120 to execute arithmetic operations on data in the general purpose register file 114, the identity of the arithmetic operations being a unique result of the interpretation of the tagged instruction at the processor element 100. Still further, in accordance with the invention, the control signals output from the instruction decoder 118, control the interconnection switch 106, to interconnect the results provided by the arithmetic elements 120, to one or more of the links 122. The links 122 connect the result information computed by the arithmetic elements 120, to the general purpose register files of one or more of the other processor elements in the array 50B.

The data bus 104 is also connected to the data memory 110 in FIG. 4A, which is then further connected to the multiplexer 112. The multiplexer 112 is controlled by control signals output from the instruction decoder 118, to apply data received on the data bus 104, to selected locations in the general purpose register file 114. The selector 116 shown in FIG. 4A selectively connects storage locations in the general purpose register file 114 with other functions in the processor element 100, such as selected ones of the arithmetic elements 120, or with selected links 122 through the interconnection switch 106.

The combination of the tag value 300 from the tagged instruction with the processor identity for the processor element 100, in the instruction decode 118, can be any one of a variety of combinatorial operations, such as concatenation, addition, multiplication, exclusive o-ring, or other combinatorial operations which can produce a suitable masking value for the interpretation of the opcode.

In this manner, a single tagged instruction broadcast from the control unit 206, can selectively control the routing of results from a first processor element 100 in the array 50B to other processor elements 100' in the array 50B.

Reference can now be made to FIG. 6 which shows an alternate arrangement for the sequencing processor control units 206 and the processing elements 100 in the array 50C. The array 50C can once again have each of the respective processing elements 100, 100' and 100" dynamically changing the destination for transmitting the arithmetic results from a first processor to a second processor, by using the interconnection switch 106 in each respective processing element 100 to output the arithmetic results from that processing element over a selected link 122 to a next processing element in the array 50C. This operation can be performed in a multi-instruction, multi-data processing array 50C, where the sequencing processor control units 206, 206' and 206" fetch diverse instructions for separate instruction streams from the separate local memories 204, 204' and 204". Coordination of these operations can take place over the control unit bus 203, which can also be used to distribute common instructions to have 2 or more of the instruction control units propagating identical instructions for the appropriate application.

Turning now to FIG. 7, still another interconnection arrangement can be configured using the interconnection switches 106 and the respective processing elements 100 in the array 50D to form a linear ring organization shown in FIG. 7. In FIG. 7, the processing elements 100, 100A and 100B in the left hand column of the array 50D, can cascade their results so that processor 100 outputs its results over line 101 to processor 100A, processor 100A outputs its results over line 101A to processor 100B (for N=3), and then processor 100B outputs its results over line 103 to processor 100. This linear ring organization is configured by virtue of the instruction decode 118 and each respective processing elements 100, 100A and 100B, appropriately combining the tag value 300 from the common instruction broadcast to all of the processors 100, 100A and 100B, so that an appropriate interpretation is made of the opcode portion of the instruction, to interconnect the interconnection switch 106, into the cascaded configuration shown for the processors in FIG. 7. In this manner, the inter-processor configuration for the processors in an array of processors, can be dynamically reconfigured. Examination of FIG. 7 will show that a similar configuration of a linear ring is formed for the processors 100', 100'A and 100'B for the instruction stream output by the sequencer processor 206'. Similarly, a linear ring organization is created for the processors 100", 100"A and 100"B executing the instructions output from the sequencer processor 206".

Reference can now be made to FIG. 8 which shows still another array 50E for the processor elements 100, 100' and 100" to configure a 3×3 mesh machine organization with four neighborhood processors. As is seen in FIG. 8, each processor, for example processor 100'A, has four nearest neighbor processors connected by a north, east, west and south respective links 122. The interconnection of the links 122 is accomplished as previously described by the appropriate interpretation of the instruction in the instruction decode 118 to configure the interconnection switch 106 and thereby interconnect a given processor with its respective four nearest neighbors, as is shown in FIG. 8.

Figure 9:
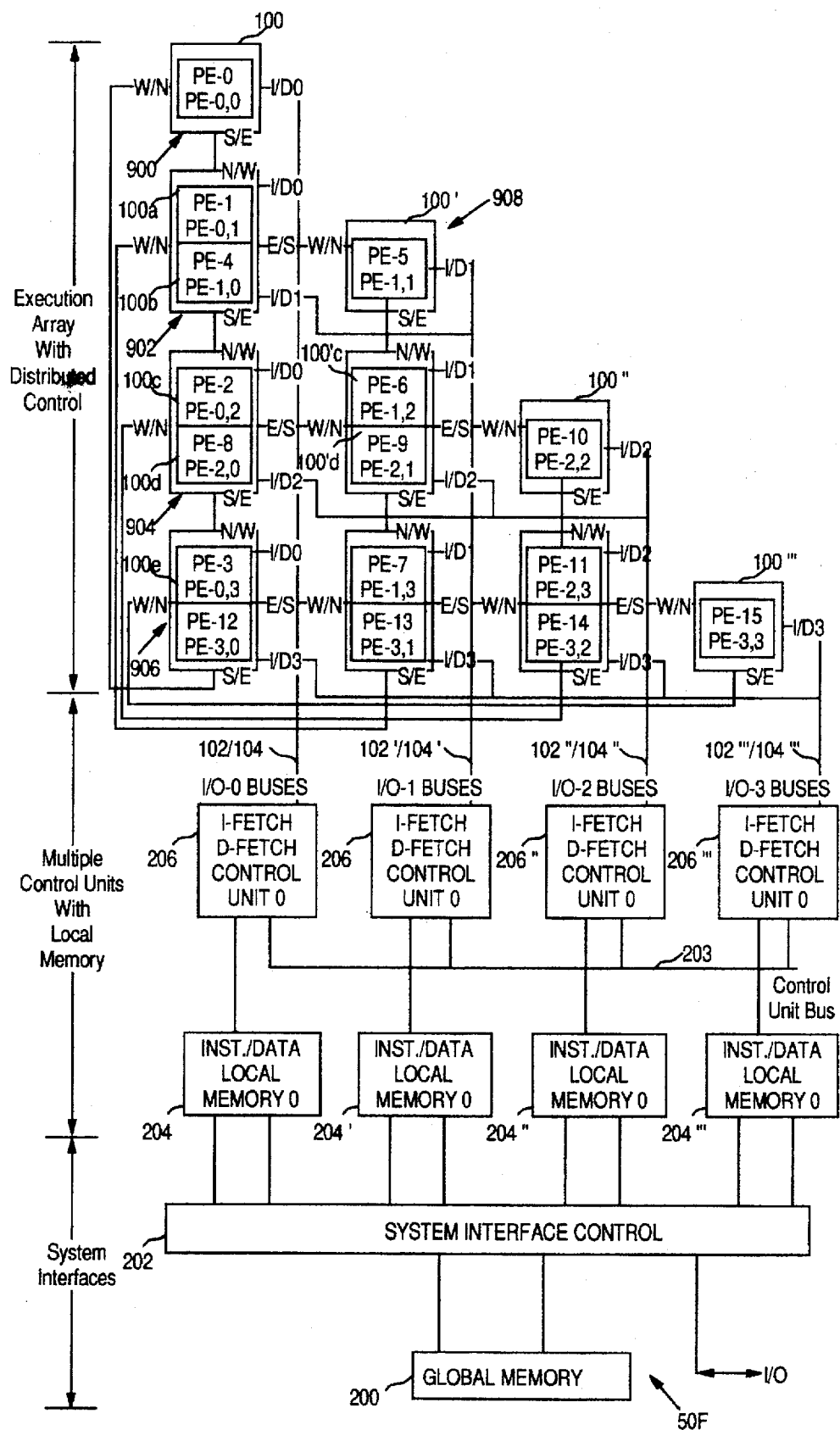
FIG. 9 is a diagonal fold 4×4 nearest neighbor mesh.

Reference can now be made to FIG. 9 which shows a diagonal fold 4×4 nearest neighbor mesh array 50F. In the processor organization shown in FIG. 9, each of the processors, for example the processor 100'C, is interconnected to its four nearest neighbor processors by means of links labelled north, east, west and south, which are the links 122 previously referred to as being selectively configured by the interconnection switch 106 for the processor 100'C. The interconnection of the links 122 is accomplished by control signals output from the instruction decode 118 after appropriate interconnection of an instruction by combining the tag value 300 with a processor identity, to uniquely interpret the instruction and provide interconnection signals for the interconnection switch 106. The links 122 enable the four nearest neighbors for the processor 100C' to be connected for an exchange of the arithmetic results from the processor's arithmetic operations in the arithmetic elements 120. Also shown in FIG. 9 is the co-location of two processors at a single node 902, 904, or 906, etc., respectively. Each pair of processors at a node, for example at node 902, can communicate its arithmetic results to its nearest neighbors in the manner previously described. In addition, in an alternate embodiment of the invention, each processor pair, for example 100A and 100B in the node 902 of FIG. 9, can communicate its results to the other processor in the node, using the interconnection switch 106, as described above.

In this manner, the processor elements in a multi-processor array, can dynamically reconfigure their interconnections for communicating results from one processor to another, using the invention disclosed herein.

Figure 10:
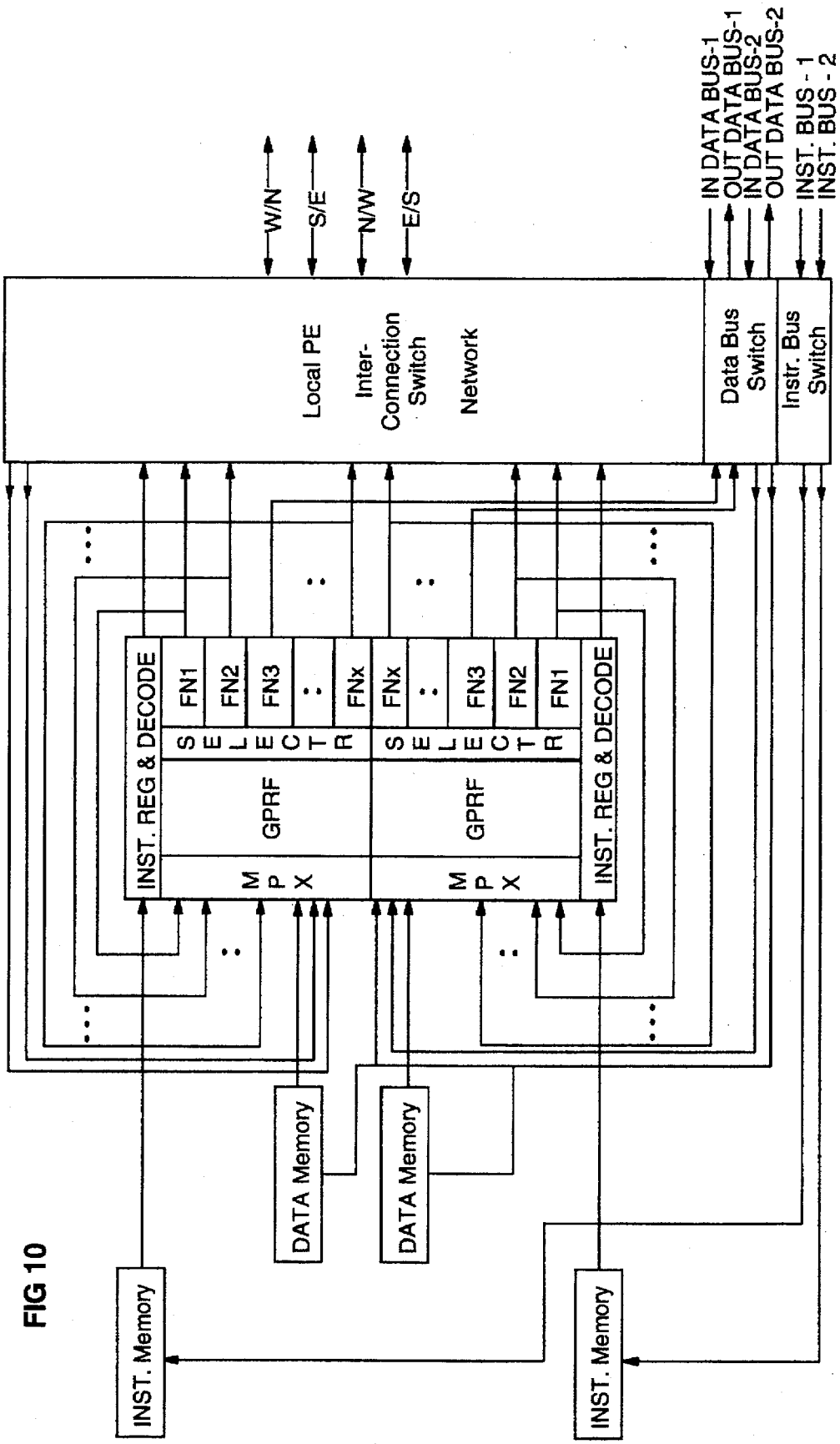
FIG. 10 is a generalized nearest neighbor mesh dual processing element.

An example of a dual processor node structure for a four neighborhood folded nearest neighbor mesh PE topology is shown in FIG. 10. The dual processor node is made up of a cluster of 2 independent PEs that share the execution unit outputs as inputs to the GPRFs by multiple wiring connections symbolically shown in FIG. 10 as a common input multiplexer (MPX). The other novel characteristic of the dual PE nodes is the Data Bus Switch and Instruction Bus Switch blocks that allows each PE of the cluster to be connected to either the row or column bus Instruction/Data Bus-1 or 2.

In more detail, the Data Bus Switch box in FIG. 10 supports the interconnection of Data Bus-1 and Data-Bus 2 to the row and column PEs of the folded mesh. With Data Bus-1 and Data Bus-2 consisting of separate input and separate output buses, In Data Bus-1/2 and Out Data Bus-1/2, by proper switch controls it is possible to load data into the columns (rows) while simultaneously storing data from the rows (columns). For example, this capability is used in high performance matrix multiplication for 3-Dimensional Graphics functions. It is noted that a Functional Element FNi can be as simple as a pass through function connecting the register file to the data bus as indicated in FIG. 10 for FN3.

Figure 11:
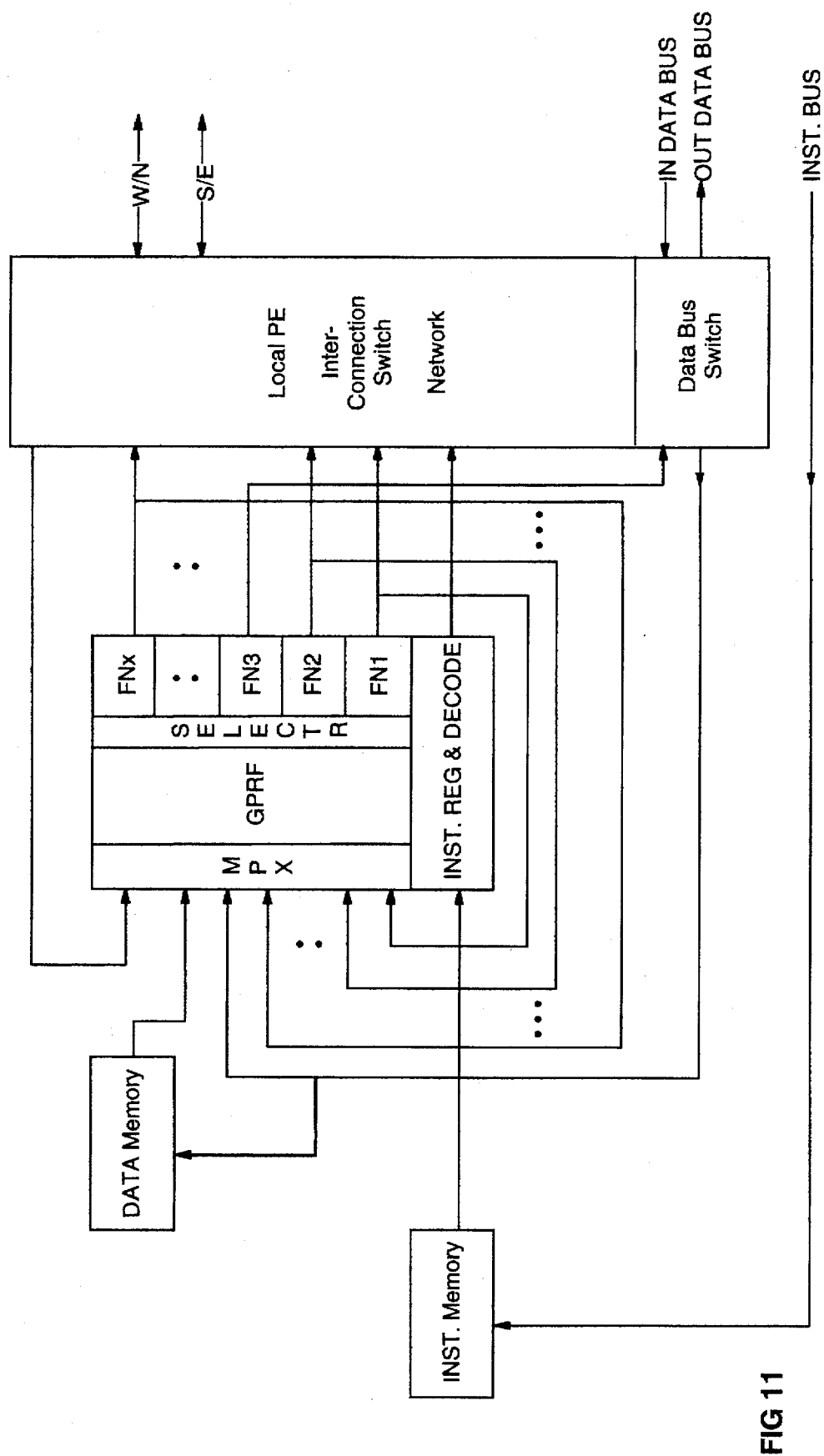
FIG. 11 is a generalized nearest neighbor mesh diagonal processing dement.

In FIG. 10, four nearest neighbor I/O ports are utilized in the symmetric dual PE "cell" as controlled from instruction decode logic. The instruction decode logic controls not only the direction of the I/O ports but also the setting of the switches/gating logic linking the I/O ports to the transmitting and receiving registers. It should be noted that the N, E, W, and S receiving/transmitting mechanisms consists of four bi-directional driver/receiver mechanisms each responsive in one state to drive signals from the PE to an attached receiving PE and responsive in another state to receive signals to the PE from an attached transmitting PE. The diagonal PEs, FIG. 11, share the West/North ports and the South/East ports requiring only two nearest neighbor ports per diagonal PE "cell". It should be noted that the receiving/transmitting mechanisms consists of two bi-directional driver/receiver mechanisms each responsive in one state to drive signals from the PE to an attached receiving PE and responsive in another state to receive signals to the PE from an attached transmitting PE. Technologies not allowing internal bi-directional drivers can still implement this architecture using multiple in and out ports, as shown in FIGS. 10 and 11.

It will be noticed in FIG. 9 that the Instruction and Data Busses each connect to a set of N=4 PEs. The N sets of PEs represent N-rings. Each ring, then, is supported by its own Sequence Processor and local instruction and data memory. As shown in FIG. 9, the four Sequence Processors are themselves connected by an extendable bus, the Control Unit Bus 203, which is used to distribute instructions allowing a single control unit to operate all of the PEs in a SIMD mode. Consequently, there are multiple operating modes defined for the processor; for example ting mode, array mode, and asymmetric edge mode.

In Ring Mode, there are N rings of N PEs where each ring is operated independently in SIMD fashion.

To support N independent SIMD rings, N independent Sequence Processors are provided. FIG. 12 depicts a standard nearest neighbor mesh (A), the folded mesh with Column Rings (CR#) identified (B), and the folded mesh with Row Rings (RR#) identified (C). By an architected method of switching the instruction and data paths in the dual PEs, the array can be dynamically switched between configurations.

In Array Mode, where the entire N×N PE array (M×N in general) is operated in SIMD fashion.

When the array of PEs is operated as a single N×N SIMD array, one of the N control units (at a time) will distribute instructions to operate the entire array of PEs. When operated in this way, one of the N control units is designated to provide the instruction thread to be executed; the instructions accessed by the chosen control unit are then distributed via the Control Unit Bus to the other N-1 control units where they are decoded and executed in the usual way. The control units which are not fetching instructions will disable their fetch logic. As just noted, one of the N control units will serve to distribute the instructions being executed. However, any control unit may serve this function; and it is possible to dynamically change the processor serving this function.

In Asymmetric Edge Mode, one sequencer controls 2N-1 PEs, a second sequencer controls 2N-3 PEs, . . . , the Nth sequencer controls 1 PE, FIG. 13. FIG. 13A is 4×4 example reference torus depicting the asymmetric PE multi-processor under one mode switch setting, FIG. 13B is the folded array configuration of FIG. 13A, FIG. 13C is a second asymmetric PE multi-processor configuration under a second mode switch setting, and FIG. 13D is the folded array configuration of FIG. 13C. Data can be loaded into the array in a similar manner and modes can be mixed between the instruction and data buses, e.g., the instruction buses can be set up in a N ring mode and the data buses can be set up in the asymmetric configuration for data loading or storing purposes. In addition, by programming the instruction and data bus switch controls uniquely in each dual PE it is possible to configure asymmetric groupings of PEs and symmetric arrays in a multi-processor configuration, e.g., a single outside edge processor group of 2N-1 PEs with a N-1 by N-1 array, two edge processor groups one with 2N-1 PEs, the second with 2N-3 PEs, and a N-2 by N-2 array, as well as other combinations.

The processor can switch between these modes under program control.

Figure 14:
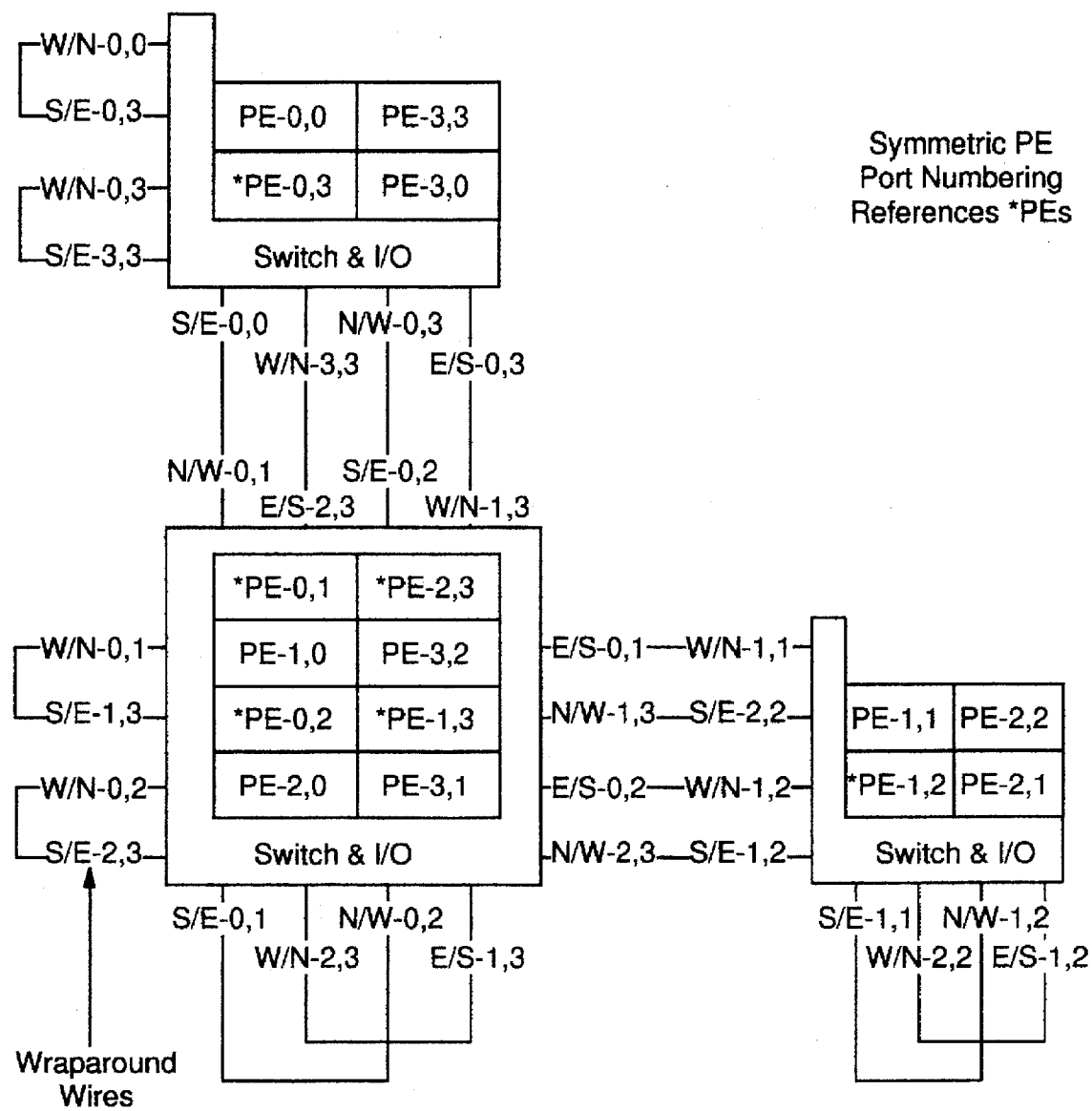
FIG. 14 is a third fold clustered processor mesh array.

FIG. 14 shows a nearest neighbor mesh folded three times. When you fold a mesh three times, the concentric rings of PEs in the standard mesh become columns of PEs in the multiple folded topology. Consequently, since the outermost concentric ring of PEs in the standard mesh are connected with each other via the wrap-around wires, the wrap-around wires become local connections within a cluster of PEs in the multiple folded topology. This becomes important as we scale the processor to 8×8 . . . and larger arrays since ALL inter-PE connections including the wrap-around torus connections become short local connections independent of the size of the array. Further by clustering the processors it is possible to create communications paths between clustered PEs that are not possible in the standard mesh.

Figure 15:
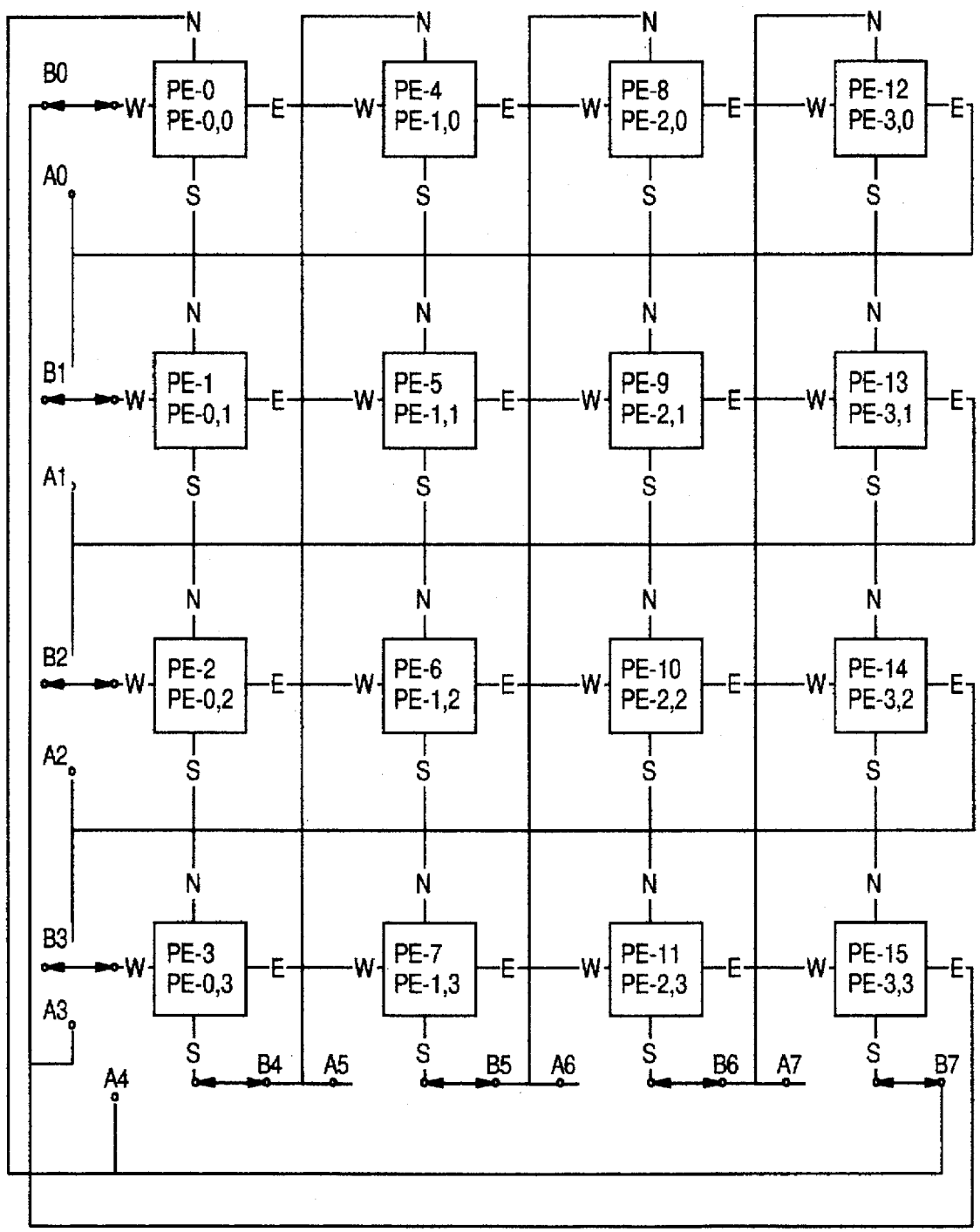
FIG. 15 is a 16 processor element linear array.
Figure 17:
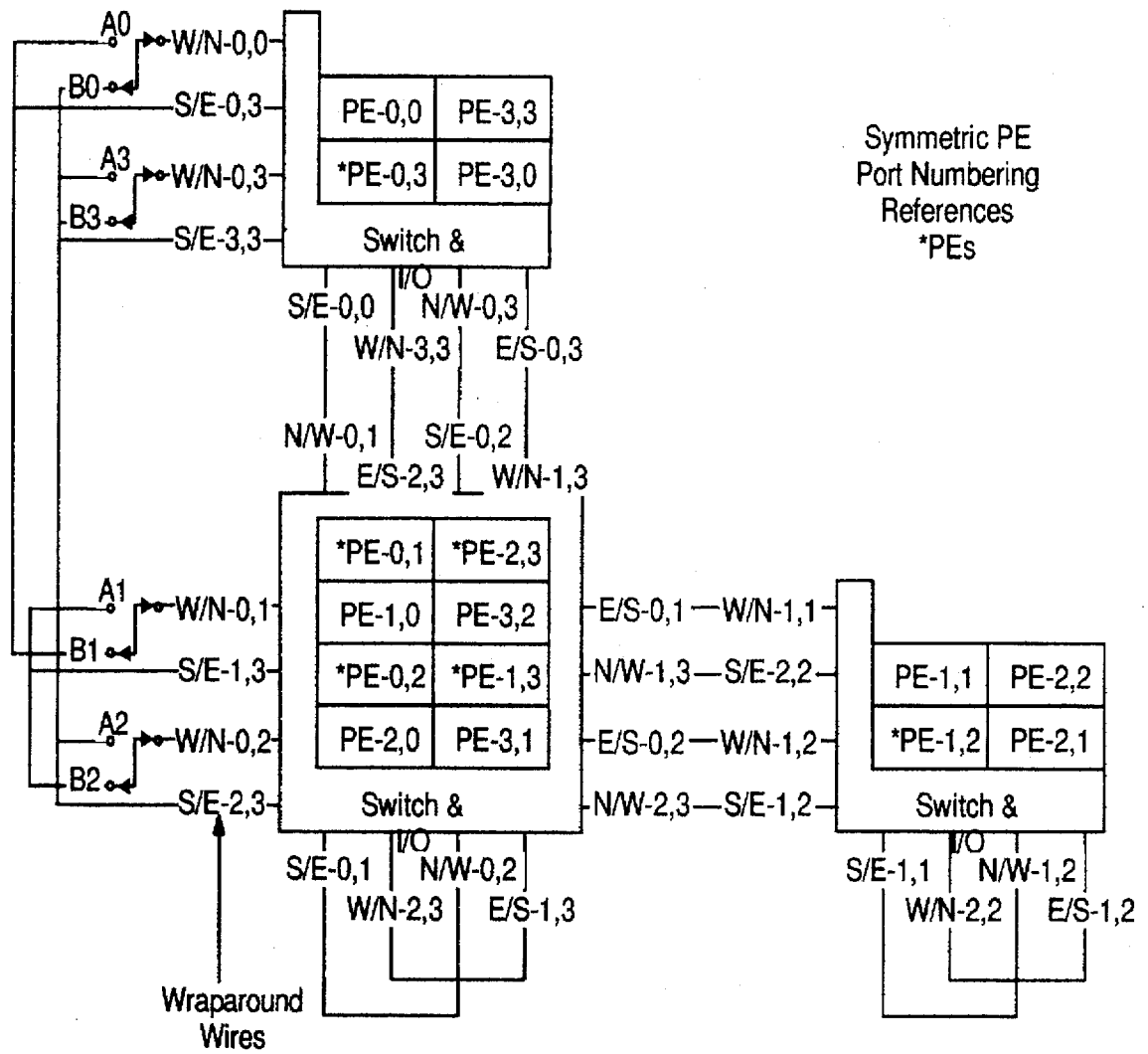
FIG. 17 is a third fold clustered processor linear array.

In an N×N array, it is possible to create a large $N^2$ linear array by providing a switching mechanism on the wrap-around wiring. The linear array can be visualized in the unfolded mesh as shown in FIG. 15 with eight switches shown connected in the B0, B1, B2, B3, B4, B5, B6, and B7 positions. (With the switches in the A0, A1, A2, A3, A4, A5, A6, and A7 positions we have the standard torus configuration.) What can be noticed in FIG. 15, with the switches configured as shown, is that the linear array can be configured in two different PE orderings by row or by column depending upon the communication direction. In the folded array processor we can accomplish the same function with half the number of switches as shown in FIG. 16. With the switches set to the B0, B1, B2, and B3 positions, then communication in the North or South direction provides the column ordered 16-PE linear array FIG. 16C. In FIG. 16C the receive (rcv) and transmit (xmt) ports are shown underneath the PEs. For example, PE-11 (a top PE) receives input on the N/W port and transmits on the S/E port through switch B3 to PE-12's (a bottom PE) W/N port. By just changing the direction of communications to the East or West direction provides the row ordered 16-PE linear array FIG. 16D. In FIG. 16D the received (rcv) and transmit (xmt) ports are shown underneath the PEs. For example, PE-11 (a top PE) receives input on the W/N port and transmits on the E/S port to PE-15's (a diagonal PE) W/N port. With the switches in the "A" position, the original torus organization is obtained. By providing a programmable organizational mode control signal to the wrap-around switches either the torus or N*N linear array can be obtained. The N*N linear array can be organized in a multiple-folded array as shown in FIG. 17. It is noted that the savings in Half the number of switches is significant, for example in a N×N N=4 topology with 32-bit wrap-around buses the unfolded mesh FIG. 15 is required to switch 8*32=256 signal lines while the linear array provides the same function with only switch 4*32=128 signal lines.

This section briefly shows how we can map a hyper-cube machine organization on a multiple-folded processor. This further demonstrates the power of the processor for providing multiple machine organizations within a single architecture.

Figure 18:
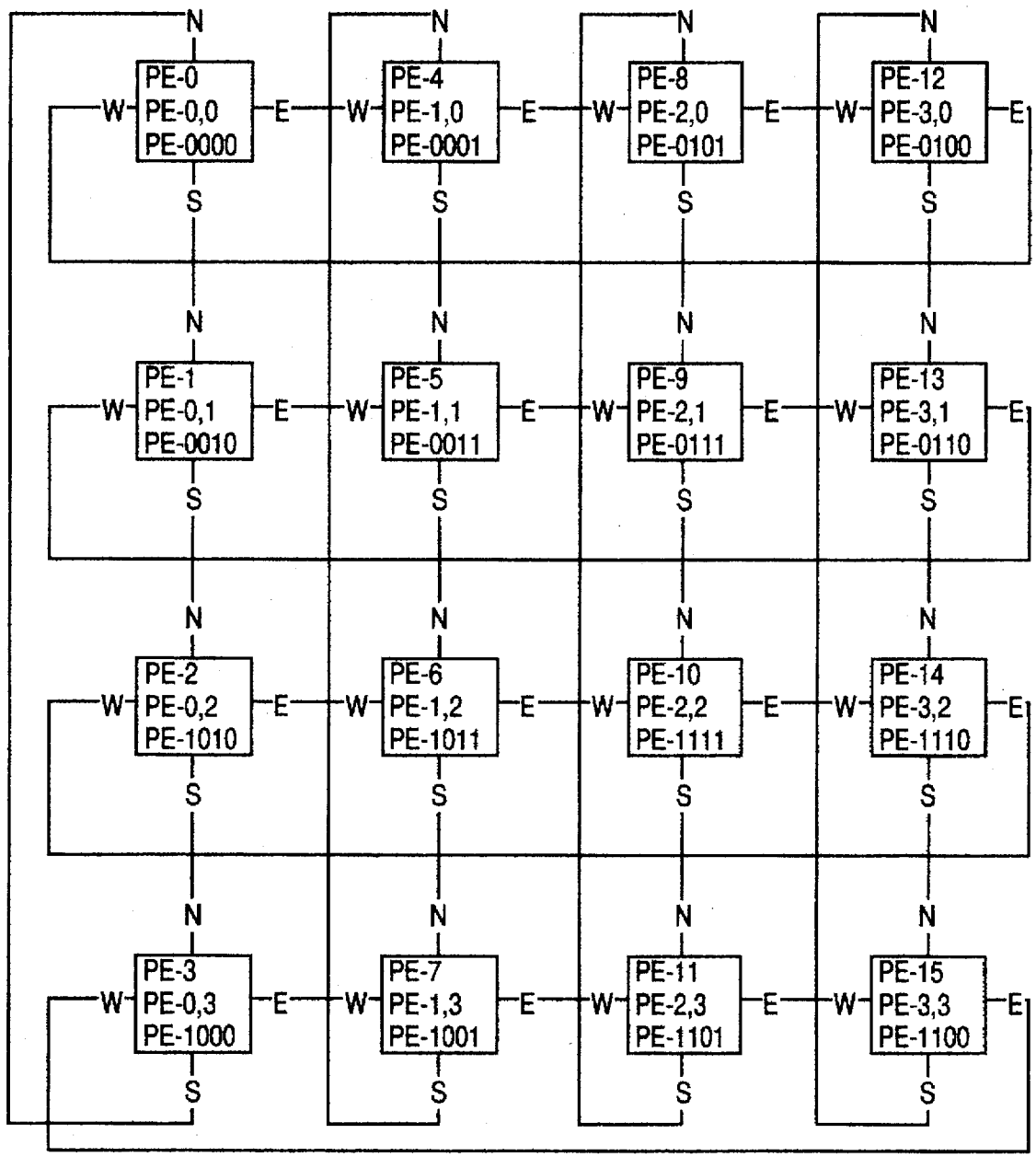
FIG. 18 is a 16 processor element four dimensional hypercube.
Figure 19:
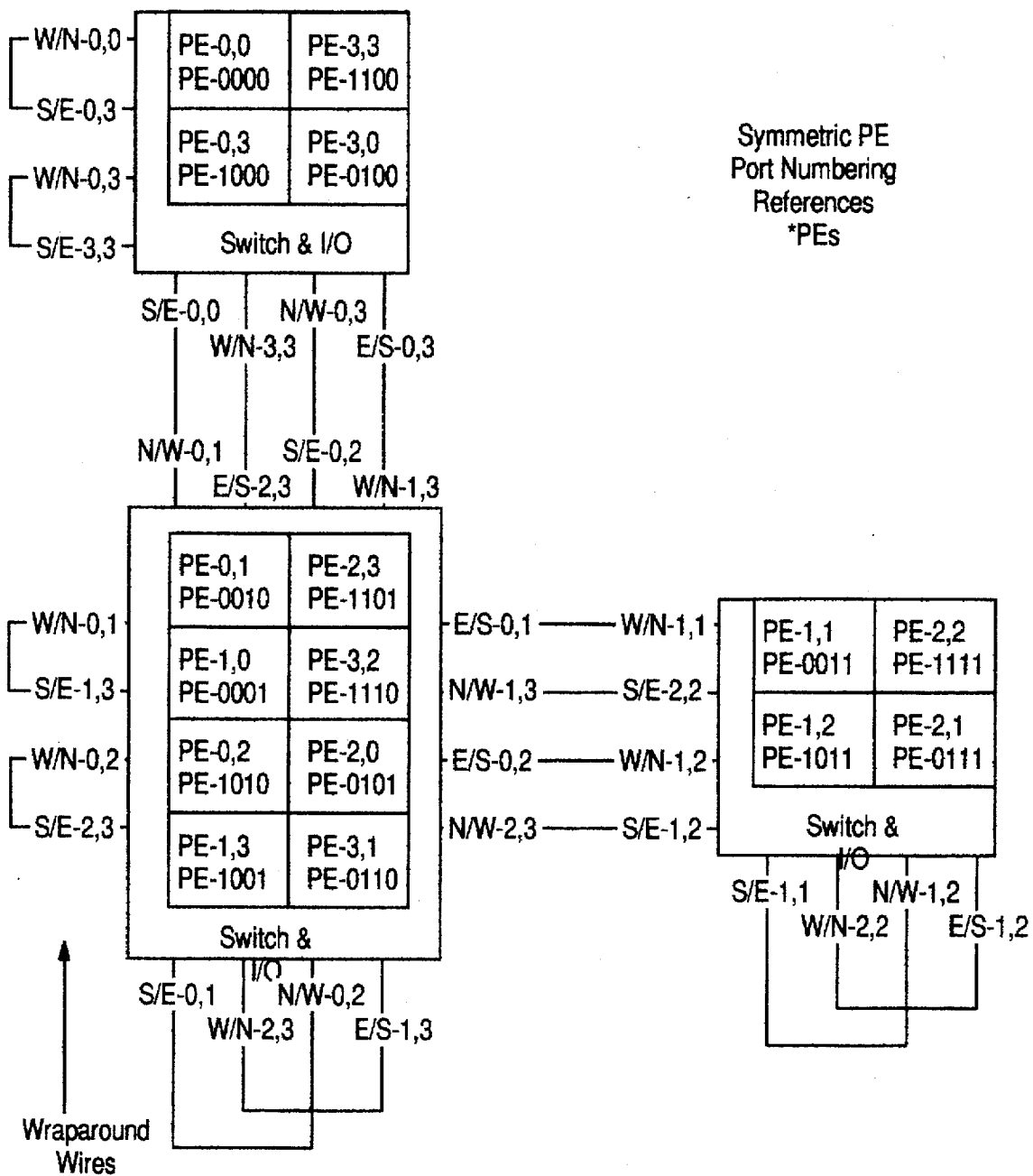
FIG. 19 is a third fold clustered processor hypercube.

We begin with FIG. 18, which shows a 4×4 nearest-neighbor mesh-connected machine organization. By simple labeling of the PE elements a one-to-one mapping of a 4-D Hyper-Cube is obtained. By folding this 4-D hyper-cube topology multiple times, a multiple-fold hyper-cube topology, FIG. 19, is formed.

Figure 20:
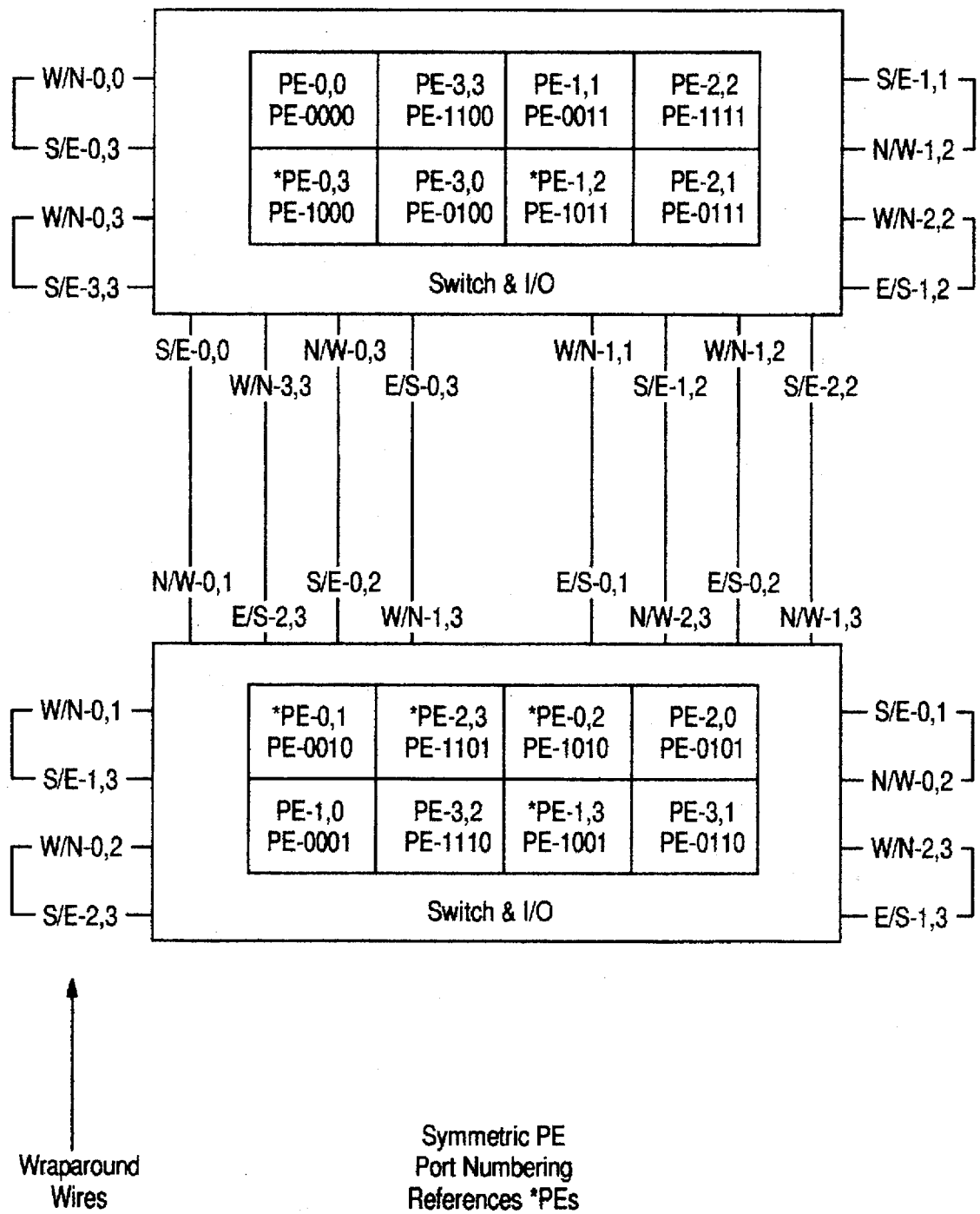
FIG. 20 is a fourth fold clustered processor hypercube.

By folding the diagonal clusters into an eight PE-cluster results in FIG. 20. It can be noticed that a hyper-cube PE and its complement are located in the eight PE clusters. This represents a new hypercube topology inherent in the multiple fold processor. Also the organization is still logically equivalent to the unfolded mesh, the folded mesh, and the multiple-folded mesh. The concept is scalable also as indicated by the 6-D hyper-cube mapping onto an 8×8 logical equivalent unfolded topology shown in FIG. 21. It can be noted that for a 6-D hyper-cube 6 ports are required for each PE well within the architecture limits. In fact, some of these wires can be shared with the nearest neighbor mesh wiring and the use of a 7th port for hyper-cube PE and their complement interfacing can also be achieved. The node-to-node hyper-cube wires mm out to be local wires within a multiple-folded cluster of processors. This can be appreciated by noting that if the 8×8 hyper-cube is folded along the vertical and horizontal axis, as indicated in FIG. 21, that the spanning PE-node to PE-node wiring becomes local wiring within clusters of PEs minimizing wire lengths and physical placement problems. (Note that the folding creates a 4×4 array of 4-PE cluster nodes. At this point the topology can be folded along the diagonal or further folds along horizontal and vertical axis creating variations of the multiple-fold organization.)

Figure 22:
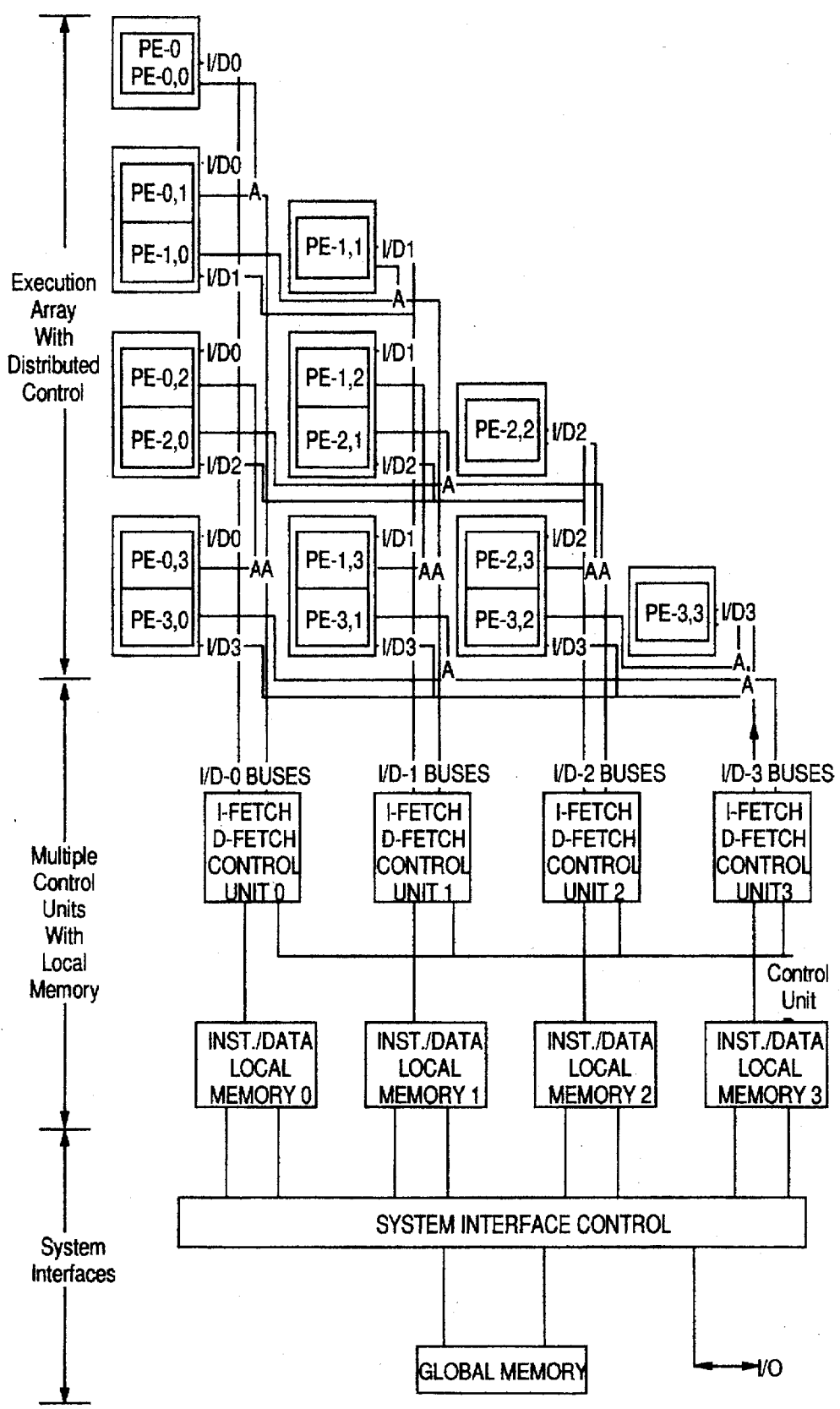
FIG. 22 is a diagonal fold 4×4 tree array.

A folded tree array topology (described in G. G. Pechanek, S. Vassiliadis, and J. G. Delgado-Frias, "Digital Neural Emulators Using Tree Accumulation and Communication Structures," IEEE Transactions on Neural Networks, pp. 934–950, November 1992, which is incorporated by reference.) and other array structures incorporating folded trees for 2-D DCT/IDCT processing and motion estimation can be depicted as shown in FIG. 22. The trees are indicated by use of "A" for the tree nodes. The "A" nodes can be as simple as adders or more complex as programmable processing elements wherein each tree node would interface with its appropriate I/D bus, for instruction and data interfacing. The tree outputs can be interfaced with an independent port on the local data memory or use the I/D bus for data output. In addition, depending upon the application requirements and technology restrictions it is possible to use communicating adder trees (G. G. Pechanek, S. Vassiliadis, and J. G. Delgado-Frias, "Digital Neural Emulators Using Tree Accumulation and Communication Structures," IEEE Transactions on Neural Networks, pp. 934–950, November 1992.) to provide a communications path from the control units to the processor elements thereby reducing bus wiring.

Figure 23:
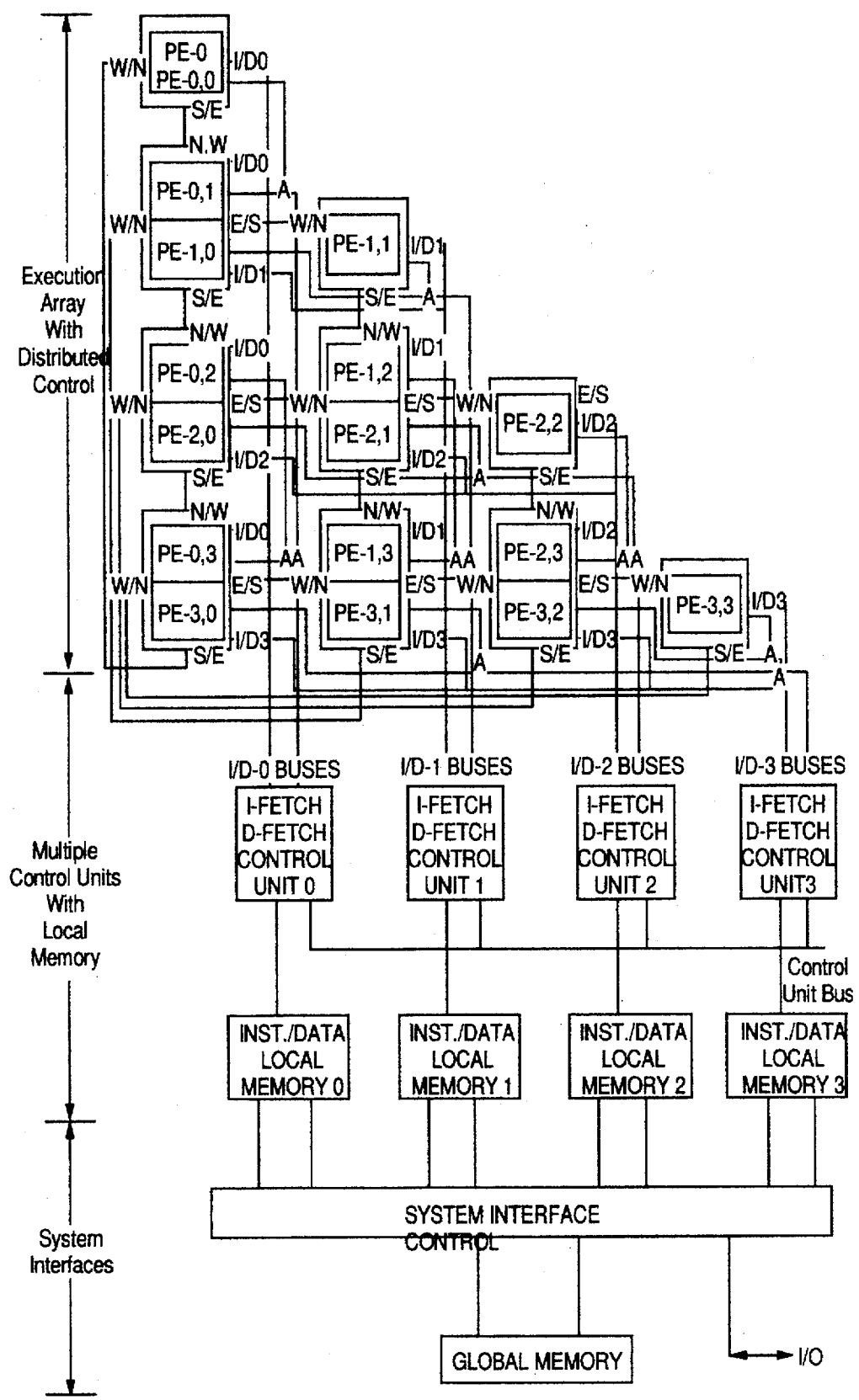
FIG. 23 is a diagonal fold 4×4 nearest neighbor tree mesh.

The folded mesh and folded tree array topologies can be combined as depicted in FIG. 23 where the N tree structures are indicated by using a capital "A" at each tree node point.

The present architecture is being developed to take advantage of all these capabilities, allowing for an almost unlimited growth path for our future processors. For example, the architecture is being developed to support up to an eight neighborhood mesh organization. For a future 8×8 machine, a simple multiple-fold 2-D four neighborhood 8×8 mesh could be built. Alternatively, an 8 neighborhood PE 3-Dimensional array could be built configured as a 3-D multiple-folded Hexagonal array using 6-nearest neighbor ports for interplane communications and 2 ports for Z-axis communications between the planes. This same configuration would also emulate 4 2-D 4×4 Meshes or a 6-D hypercube.

The problems and how they are solved summary:

The Processor provides multiple levels of parallelism and the ability to scale the architecture, computational elements, and memory capacity in a single chip machine organization. The scalability in these three areas provides implementors with great flexibility to meet their cost/performance targets for application specific products. For example, the ability to scale from a uni-processor element organization to 8×8, 16×16 or larger organizations, while maintaining simplicity of control, programming flexibility, and low-cost/high-performance implementations, provides a range of performance oriented products that grows with technology improvements under a single architecture specification. Scalability within a single architecture framework maximizes the benefit of development over a longer lifetime with a larger set of potential products.

1. Image processing and image compression/decompression algorithms require orders of magnitude more performance than is achievable in a uni-processor system, A parallel machine organization is developed to provide the improved performance.

2. a programmable platform for video processing is required,

The processing elements and control unit processors use an architected set of instructions providing programmability.

3. for a particular product domain, the algorithms may be more suited to a particular parallel processing topology than for a different product domain. Consequently, a single design point allowing multiple topologies is required, Numerous topologies and reconfigurability are supported by the machine organization and architecture. In addition, heterogeneous systems of mixed topologies can be configured.

4. a scalable design point allowing multiple products to be developed at different cost/performance levels is required, Within a selected topology, the number of PEs, number of functional elements within each PE, and the number of control units is scalable.

5. An entry level parallel processing solution requiting multiple chips may be too expensive, consequently a single chip solution is desirable, The design point allows for a single chip solution with a scalable range of configurations obtainable dependent upon technology.

Although a specific embodiment of the invention has been disclosed, it will be understood by those having skill in the art that changes can be made to the specific embodiment without departing from the spirit and the scope of the invention.

What is claimed is:

1. A data processing system, comprising:

a memory means, for storing instructions and data;

a first control unit coupled to the memory means, for fetching first instructions and first data, said first instructions each including a tag portion and an opcode portion;

a first processor element coupled to the first control unit by means of a first data bus and a first instruction bus, the first processor element having a first unique identity value and a first inter-processor link;

a second processor element coupled to the first control unit by means of the first data bus and the first instruction bus, the second processor element having a second unique identity value and a second inter-processor link;

a third processor element coupled to the first control unit by means of the first data bus and the first instruction bus, the third processor element having a third unique identity value and a third inter-processor link;

the first processor element including an instruction decoder coupled to the first instruction bus, for receiving a particular one of said first instructions, the decoder combining the tag value of said particular instruction with the processor identity of said first processor to obtain a result mask value used to interpret the opcode in the particular instruction to determine how the particular instruction is to be executed at the first processor;

the first processor element further including an arithmetic element coupled to the first data bus and coupled to the instruction decode therein, for executing said particular one of the first instructions in response to said instruction decode thereof determining how said particular instruction is to be executed at the first processor;

the first processor element further including an interconnection switch coupled to said arithmetic element and to the first, second and third inter-processor links, for selectively transferring data from said arithmetic element to the second or third processor elements in the array in response to said instruction decode thereof decoding said particular instruction;

whereby a single instruction broadcast from the first control unit, can selectively control the routing of results from said first processor element to other processor elements in the array.

2. The system of claim 1, which further comprises:

the first, second and third processing elements operating as a single instruction, multiple data array processor.

3. The system of claim 1, which further comprises:

the first, second and third processing elements being arranged into a first folded mesh array.

4. The system of claim 3, which further comprises:

the first and second processing elements occupying different nodes of the folded mesh array.

5. The system of claim 3, which further comprises:

the first and second processing elements occupying the same node of the folded mesh array.

6. A data processing system, comprising:

a memory means, for storing instructions and data;

a first control unit coupled to the memory means, for fetching first instructions and first data, said first instructions each including a tag portion and an opcode portion;

a second control unit coupled to the memory means, for fetching second instructions and second data, said second instructions each including a tag portion and an opcode portion;

a third control unit coupled to the memory means, for fetching third instructions and third data, said third instructions each including a tag portion and an opcode portion;

a first processor element coupled to the first control unit by means of a first data bus and a first instruction bus, the first processor element having a first unique identity value and a first inter-processor link;

a second processor element coupled to the second control unit by means of the second data bus and the second instruction bus, the second processor element having a second unique identity value and a second inter-processor link;

a third processor element coupled to the third control unit by means of the third data bus and the third instruction bus, the third processor element having a third unique identity value and a third inter-processor link;

the first processor element including an instruction decoder coupled to the first instruction bus, for receiving a particular one of said first instructions, the decoder combining the tag value of said particular instruction with the processor identity of said first processor to obtain a result mask value used to interpret the opcode in the particular instruction to determine how the particular instruction is to be executed at the first processor;

the first processor dement further including an arithmetic dement coupled to the first data bus and coupled to the instruction decode therein, for executing said particular one of the first instructions in response to said instruction decode thereof determining how said particular instruction is to be executed at the first processor;

the first processor element further including an interconnection switch coupled to said arithmetic element and to the first, second and third inter-processor links, for selectively transferring data from said arithmetic element to the second or third processor elements in the array in response to said instruction decode thereof decoding said particular instruction;

whereby an instruction broadcast from the first control unit, can selectively control the routing of results from said first processor element to other processor elements in the array.

7. The system of claim 6, which further comprises:

the first, second and third processing elements operating as a multiple instruction, multiple data array processor.

8. The system of claim 6, which further comprises:

the first, second and third processing elements being arranged into a first folded mesh array.

9. The system of claim 8, which further comprises:

the first and second processing elements occupying different nodes of the folded mesh array.

10. The system of claim 8, which further comprises:

the first and second processing elements occupying the same node of the folded mesh array.

11. A data processing system, comprising:

a memory means, for storing instructions and a data source for providing data;

a first control unit coupled to the memory means, for fetching first instructions, said first instructions each including a tag portion and an opcode portion;

a first processor element coupled to the first control unit by means of a first instruction bus and coupled to the data source by means of a first data bus, the first processor element having a first unique identity value and a first inter-processor link;

a second processor element coupled to the first control unit by means of the first instruction bus and coupled to the data source by means of the first data bus, the second processor element having a second unique identity value and a second interprocessor link;

a third processor element coupled to the first control unit by means of the first instruction bus and coupled to the data source by means of the first data bus, the third processor element having a third unique identity value and a third inter-processor link;

the first processor element including an instruction decoder coupled to the first instruction bus, for receiving a particular one of said first instructions, the decoder combining the tag value of said particular instruction with the processor identity of said first processor to obtain a result mask value used to interpret the opcode in the particular instruction to determine how the particular instruction is to be executed at the first processor;

the first processor element further including an arithmetic element coupled to the first data bus and coupled to the instruction decode therein, for executing said particular one of the first instructions in response to said instruction decode thereof determining how said particular instruction is to be executed at the first processor;

the first processor element further including an interconnection switch coupled to said arithmetic element and to the first, second and third inter-processor links, for selectively transferring data from said arithmetic element to the second or third processor elements in the array in response to said instruction decode thereof decoding said particular instruction;

whereby a single instruction broadcast from the first control unit, can selectively control the routing of results from said first processor element to other processor elements in the array.

12. The system of claim 11, which further comprises:

the data source being a realtime data source; and the first, second and third processing elements operating as a single instruction, multiple data array processor operating on realtime data.

13. The system of claim 11, which further comprises:

the first, second and third processing elements being arranged into a first folded mesh array.

14. The system of claim 13, which further comprises:

the first and second processing elements occupying different nodes of the folded mesh array.

15. The system of claim 13, which further comprises:

the first and second processing elements occupying the same node of the folded mesh array.

16. A data processing system, comprising:

a memory means, for storing instructions and a data source for providing data;

a first control unit coupled to the memory means, for fetching first instructions, said first instructions each including a tag portion and an opcode portion;

a second control unit coupled to the memory means, for fetching second instructions, said second instructions each including a tag portion and an opcode portion;

a third control unit coupled to the memory means, for fetching third instructions, said third instructions each including a tag portion and an opcode portion;

a first processor element coupled to the first control unit by means of a first instruction bus and coupled to the data source by means of a first data bus, the first processor element having a first unique identity value and a first inter-processor link;

a second processor element coupled to the first control unit by means of a second instruction bus and coupled to the data source by means of a second data bus, the second processor element having a second unique identity value and a second inter-processor link;

a third processor element coupled to the first control unit by means of a third instruction bus and coupled to the data source by means of a third data bus, the third processor element having a third unique identity value and a third inter-processor link;

the first processor element including an instruction decoder coupled to the first instruction bus, for receiving a particular one of said first instructions, the decoder combining the tag value of said particular instruction with the processor identity of said first processor to obtain a result mask value used to interpret the opcode in the particular instruction to determine how the particular instruction is to be executed at the first processor;

the first processor element further including an arithmetic element coupled to the first data bus and coupled to the instruction decode therein, for executing said particular one of the first instructions in response to said instruction decode thereof determining how said particular instruction is to be executed at the first processor;

the first processor element further including an interconnection switch coupled to said arithmetic element and to the first, second and third inter-processor links, for selectively transferring data from said arithmetic element to the second or third processor elements in the array in response to said instruction decode thereof decoding said particular instruction;

whereby a single instruction broadcast from the first control unit, can selectively control the routing of results from said first processor element to other processor elements in the array.

17. The system of claim 16, which further comprises:

the data source being a realtime data source; and the first, second and third processing elements operating as a multiple instruction, multiple data array processor operating on realtime data.

18. The system of claim 16, which further comprises:

the first, second and third processing elements being arranged into a first folded mesh array.

19. The system of claim 18, which further comprises:

the first and second processing elements occupying different nodes of the folded mesh array.

20. The system of claim 18, which further comprises:

the first and second processing elements occupying the same node of the folded mesh array.

21. A data processing method, comprising:

storing instructions in a data processing system;

fetching a first instruction including a tag portion and an opcode portion;

combining the tag portion of said first instruction with a unique identity value of a first processor to obtain a result mask value used to decode the opcode of the first instruction, to determine how the first instruction is to be executed in the processor element;

identifying a second processor element in response to said decoding of said instruction using said unique identity of the first processing dement; and selectively transferring a result from executing said instruction from the first processor element to a second processor element in response to said decoding of said instruction using said unique identity of the first processing element.

* * * * *